US006523899B1

(12) United States Patent
Tame

(10) Patent No.: US 6,523,899 B1
(45) Date of Patent: Feb. 25, 2003

(54) AUTOMATED FOLD AND TUMBLE VEHICLE SEAT ASSEMBLY

(75) Inventor: Omar D. Tame, West Bloomfield, MI (US)

(73) Assignee: Magna Seating Systems, Inc., Aurora (CA)

(*) Notice: Subject to any disclaimer, the term of this patent is extended or adjusted under 35 U.S.C. 154(b) by 0 days.

(21) Appl. No.: 09/807,161
(22) PCT Filed: Oct. 8, 1999
(86) PCT No.: PCT/CA99/00941
§ 371 (c)(1),
(2), (4) Date: Jun. 14, 2001
(87) PCT Pub. No.: WO00/21778
PCT Pub. Date: Apr. 20, 2000

Related U.S. Application Data
(60) Provisional application No. 60/103,600, filed on Oct. 9, 1998.

(51) Int. Cl.⁷ .................................................. B60N 2/02
(52) U.S. Cl. ........................ 297/331; 297/335; 297/336; 297/378.12
(58) Field of Search ................................. 297/331, 335, 297/336, 378.12

(56) References Cited
U.S. PATENT DOCUMENTS

| 1,857,106 A | * | 5/1932 | Bishop | 248/393 |
| 4,695,094 A | * | 9/1987 | Siebler | 297/331 |
| 4,700,989 A | | 10/1987 | Ercilla | |
| 4,844,542 A | * | 7/1989 | Humer | 297/341 |
| 5,282,662 A | | 2/1994 | Bolsworth et al. | |
| 5,671,965 A | | 9/1997 | O'Conner | |
| 5,732,923 A | * | 3/1998 | Tame | 248/430 |
| 5,743,596 A | | 4/1998 | Chabanne | |
| 5,765,894 A | | 6/1998 | Okazaki et al. | |
| 5,951,086 A | * | 9/1999 | Hoshino et al. | 296/65.03 |
| 6,250,704 B1 | * | 6/2001 | Garrido | 296/65.05 |

FOREIGN PATENT DOCUMENTS

| DE | 39 27 253 A1 | 2/1991 |
| DE | 195 10 618 A1 | 11/1995 |
| DE | 195 44 833 A1 | 6/1997 |
| EP | 0 780 259 B1 | 11/1996 |
| GB | 2291585 A | * 1/1996 |

OTHER PUBLICATIONS

International Search Report PCT/CA99/00941.
English Abstracts for DE 195 44 833; DE 195 10 618; EP 0 609 130; DE 39 27 253; EP 0 780 259.

* cited by examiner

Primary Examiner—Peter M. Cuomo
Assistant Examiner—Joseph Edell
(74) Attorney, Agent, or Firm—Clark Hill PLC

(57) ABSTRACT

A fold and tumble vehicle seat assembly (20) having an automatic retraction feature and an easy operation latch feature. An adjustment mechanism (30) is mounted between the seat cushion (22) and the seat riser (28) for providing fore and aft adjustment of the seat cushion. The seat assembly is characterized by a release mechanism (49) mounted adjacent the adjustment mechanism (30) for automatically unlocking the adjustment mechanism and moving the seat cushion toward the aft position during the tumbling of the seat assembly. The seat assembly also comprises a rear latch (70, 71) pivotally mounted to the rear seat support (50, 51) and moveable between an engaged position securing the seat assembly in the operative position and a disengaged position allowing the seat assembly to move into the tumbled position. A stop member (92, 94) pivotally mounted to the rear seat support (50, 51) holds the rear latch (70, 71) in the disengaged position.

18 Claims, 20 Drawing Sheets

AUTOMATED FOLD AND TUMBLE VEHICLE SEAT ASSEMBLY

This application claims the benifit of Provisional application No. 60/103,600, filed Oct. 9, 1998.

BACKGROUND OF THE INVENTION

1. Technical Field

The subject invention relates to a vehicle seat and more particularly to a vehicle seat of the fold and tumble type.

2. Description of the Prior Art

Fold and tumble vehicle seats are well known. Basically, seats of this type include a seat riser which is constructed and arranged to engage forward and rearward floor anchors in a vehicle. The seat riser serves to support a seat cushion which in turn supports a foldable seat back. The advantage of a fold and tumble seats are that when the seat back is folded into a forward storage position overlying the seat cushion and the seat riser is released from the rear floor anchors and pivoted or tumbled forwardly about the forward floor anchors, the entire seat can be move into a storage position allowing the vehicle floor from which the seat has been turned to be used for other activities. In addition, on many of the fold and tumble vehicle seats, the seat riser can be released from the forward floor anchors such that the entire seat can be removed from the vehicle. Typically, a fold and tumble seat would be a rear seat in a van, sport utility vehicle or the like. Examples of fold and tumble seats, which may or may not be removable, are found in U.S. Pat. Nos. 4,700,989; 5,280,987; 5,282,662, 5,364,152; 5,671,965, and 5,743,596; and German Patent No. 195 44 833.

It is sometimes desirable that a fold and tumble seat be capable of fore and aft adjustment within the vehicle. Such fore and aft adjustment is usually provided by conventional fore and aft seat tracks which allow the seat to be moved forwardly from a rearwardly operative position into a multiplicity of forward operative positions. One problem that is presented by an adjustment of this type for a fold and tumble seat is that when the seat is disposed in a forward operative position and it becomes desirable to move the seat into its storage position, it is first necessary to move the seat cushion into its rearward operative position before effecting the fold and tumble movement of the seat into its storage position. The initial rearward movement of the seat cushion into its rearward operative position is desirable in order to prevent the forward portion of the folded seat back from engaging the floor and preventing the seat from reaching its fill storage position. There exist a need to simplify the fold and tumble procedure for fold and tumble seats to alleviate the above problem.

SUMMARY OF THE INVENTION AND ADVANTAGES

A fold and tumble vehicle seat assembly having an automatic retraction feature and an easy operation latch feature. The seat assembly comprises a seat cushion and a seat back mounted to the seat cushion. A seat riser, having forward and rearward ends, is mounted to the seat cushion for supporting the seat assembly in an operative position. An adjustment mechanism is mounted between the seat cushion and the seat riser for providing selected fore and aft adjustment of the seat cushion. A locking device is disposed on the adjustment mechanism for selectively locking the adjustment mechanism and the seat cushion to the seat riser. At least one rear seat support is mounted to the rearward end of the seat riser for supporting a rear portion of the seat assembly while the seat assembly is in the operative position. Similarly, at least one front seat support is pivotally mounted to the forward end of the seat riser for supporting a front portion of the seat assembly while the seat assembly is in the operative position and for moving the seat assembly to a tumbled position with the seat cushion pivoting upward about the front seat supports. The seat assembly is characterized by a release mechanism mounted adjacent the adjustment mechanism and selectively engaging the locking device for automatically unlocking the adjustment mechanism and moving the seat cushion toward the aft position during the tumbling of the seat assembly.

The seat assembly also comprises a rear latch pivotally mounted to the rear seat support and moveable between an engaged position securing the seat assembly in the operative position and a disengaged position allowing the seat assembly to move into the tumbled position. The seat assembly is further characterized by a stop member pivotally mounted to the rear seat support and engaging the rear latch when the rear latch is in the disengaged position to hold the rear latch in the disengaged position.

An object of the present invention is to fulfill the need expressed above. Preferably, the release mechanism is constructed and arranged to move the seat cushion into the rearward operative position thereof during and in response to the movement of the seat riser from the operative position thereof to the storage position thereof.

Preferably, the fore and aft adjustment mechanism includes cooperating lockable tracks mounted on the seat riser and the seat cushion respectively which are constructed and arranged to move relatively fore and aft with respect to one another. A locking device is constructed and arranged to be moveable between a locking position preventing relative movement between the cooperating tracks and a releasing position enabling relative movement between the cooperating tracks. The release mechanism is constructed and arranged to move the locking device from the locking position thereof into the releasing position thereof during the forward tumbling movement of the seat riser from the operative position thereof prior to the movement of the seat cushion from its forward operative position into the rearward operative position thereof.

Preferably, the release mechanism is constructed and arranged to allow the locking device to be returned into the locking position thereof in response to the movement of the seat riser back into the operative position thereof and the movement of the seat back into the operative position thereof.

Preferably, the seat riser includes a spring system constructed and arrange to aid in effecting the forward tumbling movement of the seat riser into the storage position thereof, which tumbling movement by the operation of the release mechanism is responsive to effect the rearward movement of the seat cushion into the rearward position thereof. Optionally, a gas strut can be provided having sufficient springing force to effect the tumbling movement of the seat riser into the storage position thereof without manual assistance irrespective of how far rearward the seat cushion must be moved by the release mechanism in response to the tumbling movement to reach the rearward position thereof.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
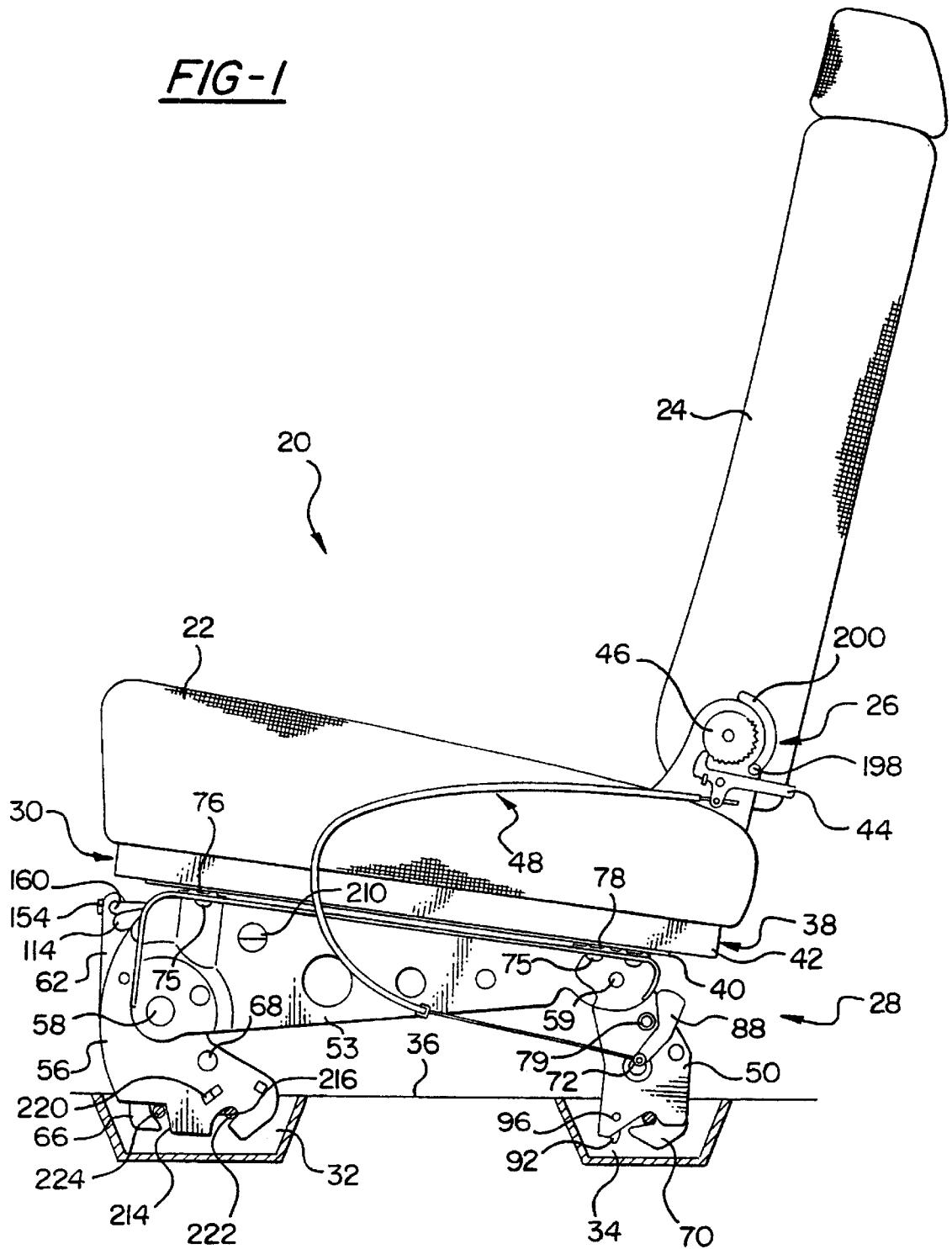
FIG. 1 is a side elevational view of a fold and tumble vehicle seat assembly in an operative position and constructed according to the principles of the subject invention.

Referring to the Figures, wherein like numerals indicate like or corresponding parts throughout the several views, a fold and tumble vehicle seat assembly is generally shown at 20. The vehicle seat assembly 20 comprises a seat cushion 22 and a foldable seat back 24 pivotally mounted to the seat cushion 22. The seat assembly 20 also includes a seat back recliner 26, a seat riser 28 and a fore and aft adjustment mechanism, generally designated 30. The seat riser 28 releasably engages conventional forward anchors 32 and rearward anchors 34 fixed to a vehicle floor 36 and supports the seat cushion 22 in an operative position. The seat back recliner 26 pivotally mounts the seat back 24 on the seat cushion 22 so the seat back 24 can be released from the operative position and folded forwardly to a storage position overlying the seat cushion 22 as shown in FIG. 2.

The seat cushion 22 is mounted on the seat riser 28 by the adjustment mechanism 30 such that the seat cushion 22 can be moved fore and aft when the seat assembly 20 is in the operative position. The adjustment mechanism 30 includes conventional cooperating lockable tracks 38 comprising a pair of fixed tracks 40 mounted on the seat riser 28 and a pair of movable tracks 42 mounted on the seat cushion 22. The movable tracks 42 are interengaged with and rollingly supported by the fixed tracks 40.

The seat cushion 22 and the seat back 24 are each include a covered cushion mounted to a frame (not visible) preferably made of metal. The frame of the seat back 24 and the frame of the seat cushion 22 can be constructed of any material of adequate strength such as high strength aluminum. The seat riser 28 is preferably constructed of steel, but can be constructed of any material of adequate strength.

Figure 2:
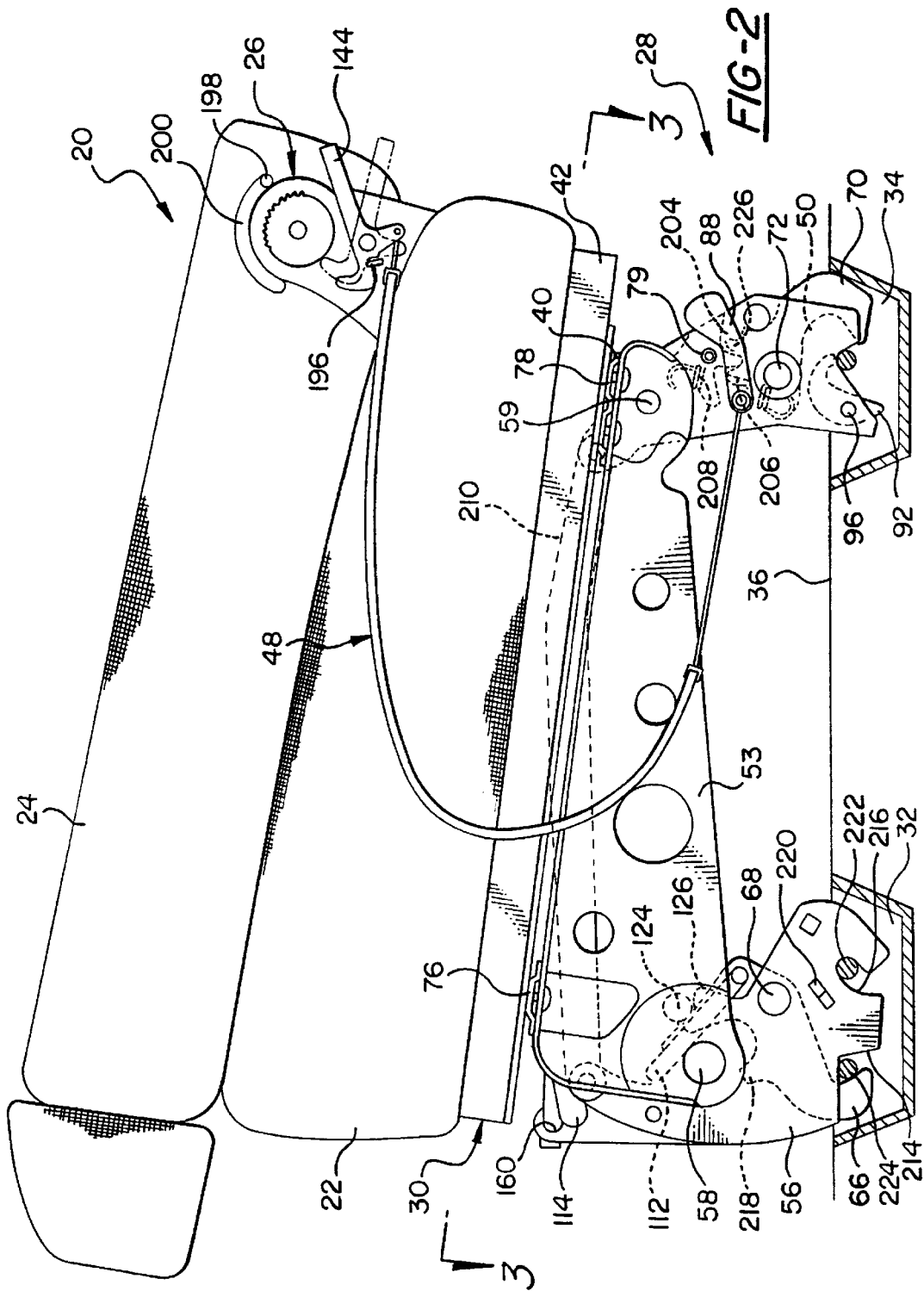
FIG. 2 is a side elevational view of the seat assembly similar to FIG. 1 showing a seat back in a folded position.

The seat back recliner 26 shown in FIGS. 1 and 2 is a conventional sector gear recliner mechanism. A release handle 44 is mounted on the frame of the seat cushion 22 and is spring-biased into a sector gear 46 of the recliner 26 mounted on the frame of the seat back 24 to hold the seat back 24 in the operative position.

A conventional bowden wire cable 48 is mounted between the release handle 44 and a rear seat support 50 of the seat riser 28. The handle 44 can be used to adjust the reclining position of the seat back 24 and to fold and tumble the seat assembly 20. Specifically, the release handle 44 is moveable between an engaged position interlocking the recliner 26 to secure the seat back 24 in a desired inclination and a disengaged position releasing the recliner 26 to allow the seat back 24 to pivot downward against the seat cushion 22. When the seat back 24 is folded to the storage position, the release handle 44 can actuate the bowden wire cable 48 to unlatch the rear seat supports from the rearward anchors 34 (as shown in FIG. 2) so that the seat assembly 20 can be tumbled to the storage position.

When the seat assembly 20 is in the operative position, the lockable tracks 38 allow the seat assembly 20 to be adjusted to move the seat cushion 22 forwardly from a rearward operative position into a multiplicity of forward operative positions. When the seat cushion 22 is in a forward operative position and it is desired to fold and tumble the seat assembly 20 to the storage position, it is desirable to move the seat cushion 22 into its rearward operative position during the fold and tumble movement to prevent the seat assembly 20 from engaging the floor 36 because contact between the seat assembly 20 and the floor 36 may prevent the seat assembly 20 from completely moving into the storage position.

The seat assembly 20 incorporates an automatic retraction feature. Specifically, the seat assembly 20 is characterized by a release mechanism 49 mounted adjacent the adjustment mechanism 30 and selectively engaging a locking device 118 for automatically unlocking the adjustment mechanism 30 and moving the seat cushion 22 toward the aft position during the tumbling of the seat assembly 20. The release mechanism 49 is mounted on the seat riser 28 to move the seat cushion 22 into its rearward operative position during the fold and tumble movement of the seat assembly 20. FIGS. 3 through 6 illustrate the seat riser 28, the adjustment mechanism 30 and the release mechanism 49 when the seat assembly 20 is in the operative position, i.e., the normal seating position. The seat cushion 22, seat back 24 and the seat back recliner 26 are not shown in FIGS. 3 through 6 to more clearly illustrate the release mechanism 49, the seat riser 28 and associated structures.

The seat riser 28, has forward and rearward ends, and includes a first riser member 53, shown in FIGS. 1, 2, 4, 11, 15 and 17, and a second riser member 54, shown in FIGS. 5, 6, 12, 13, 14, 16 and 18. To clarify the foregoing description, the first riser member 53 will be further illustrated as an outboard riser 53 and the second riser member 54 will be further illustrated as an inboard riser 54. Both the outboard 53 and inboard 54 risers have exterior and interior sides. As appreciated, the exterior sides of the risers 53, 54 are the sides that are at least partially exposed to the interior of the vehicle. The interior sides of the risers 53, 54 face inward toward each other within the seat assembly 10. The exterior side of the outboard riser 53 is shown in FIGS. 1 and 2. The interior side of the outboard riser 53 is shown in FIGS. 4, 11, 15 and 17. The exterior side of the inboard riser 54 is only shown in FIG. 6. FIGS. 5, 12, 13, 14, 16 and 18 illustrate the interior side of the inboard riser 54.

At least one rear seat support 50, 51 is mounted to the rearward end of the seat riser 28 for supporting a rear portion of the seat assembly 20 while the seat assembly 20 is in the operative position. At least one front seat support 56, 62 is pivotally mounted to the forward end of the seat riser 28 for supporting a front portion of the seat assembly 20 while the seat assembly 20 is in the operative position and for moving the seat assembly 20 to the tumbled position with the seat cushion 22 pivoting upward about the front seat supports 56, 62. The at least one rear seat support 50, 51 preferably comprises first 50 and second 51 rear legs each having a rear latch 70, 71. Similarly, the at least one front seat support 56, 62 preferably comprises first 56 and second 62 front legs each having a front latch 66, 67. The rear latches 70, 71 are pivotally mounted to the rear seat supports 50, 51 and moveable between an engaged position securing the seat assembly 20 in the operative position and a disengaged position allowing the seat assembly 20 to move into the tumbled position.

The first front leg 56 and the first rear leg 50 are pivotally mounted to the outboard riser 53 by rivets 58, 59 (shown in FIG. 1), respectively. The second front leg 62 and the second rear leg 51 are pivotally mounted to the inboard riser 54 by rivets 64, 61, respectively. The front legs 56, 62 are releasably locked to respective forward anchors 32 by spring-biased front latches 66, 67 pivotally mounted on the front legs 56, 62 by rivets 68, 73, respectively. The rear legs 50, 51 are releasably locked to respective rearward anchors 34 by spring-biased rear latches 70, 71 pivotally mounted on the rear legs 50, 51 by rivets 72, 74, respectively.

First and second release structures 84, 86 are pivotally mounted in operative relation to the rear latches 70, 71, respectively, by a connector member 79. The release structures 84, 86, are mounted to each of the corresponding rear legs 50, 51 to move the rear latches 70, 71 between the engaged and disengaged positions. Each of the release structures 84, 86 includes an outwardly extending arm 88, 89. The connector member 79 connects each of the arms 88, 89 of the release structures 84, 86 such that both of the release structures 84, 86 move in unison. The connector member 79 is pivotally mounted between the rear legs 50, 51 and the release structures 84, 86 are rigidly mounted on the connector member 79 such that when the release structures 84, 86 move in a releasing direction, they move the rear latches 70, 71 in an unlatch direction.

The bowden wire cable 48 is operatively connected to the arm portion 88 (as illustrated in FIGS. 1 and 2) of the first release structure 84 to move the first release structure 84 in the latch releasing direction when the wire cable 48 is actuated. Because, the release structures 84, 86 are rigidly connected together by member 79, the actuated bowden wire cable 48 moves both release structures 84, 86 simultaneously to unlatch the rear legs 50, 51 from the rearward anchors 34.

The seat assembly 20 also incorporates an easy operation latch feature. Specifically, the seat assembly 20 is characterized by a stop member 92, 94 pivotally mounted to the rear seat supports 50, 51 and engaging the rear latches 70, 71 when the rear latches 70, 71 are in the disengaged position to hold the rear latches 70, 71 in the disengaged position. The U-shaped stop members 92, 94 are pivotally mounted respectively to the first and second rear legs 50, 51 by rivets 96. A biasing member 98, 100 is connected to each of the stop members 92, 94 for continuously biasing the stop members 92, 94 toward the engagement with the corresponding rear latches 70, 71. Preferably, the biasing members 98, 100 are hairpin springs 98, 100 biasing the stop members 92, 94 to move into stopping relation with the rear latches 70, 71 when the rear legs 50, 51 are unlatched from the rearward anchors 34 to hold the latches 70, 71 in an open position to facilitate reengagement of the rear legs 50, 51 with the rearward anchors 34.

Clock-type springs 102, 104 are mounted on the rivets 58, 64 secured to the risers 53, 54 respectively, to bias the seat assembly 20 from the operative position toward the storage position when the rear leg 50, 51 are disengaged from the rearward anchors 34. The springs; 102, 104 comprise a spring system, generally designated 106 that helps tumble the seat assembly 20. Specifically, the spring system 106 is mounted about each of the first 56 and second 62 front legs to assist the upward pivoting movement of seat assembly 20 during the tumbling of the seat assembly 20.

The fixed tracks 40 are mounted on the risers 53, 54 by conventional bolts 75 and are reinforced by front and rear spacer members 76, 78 on outboard riser 53 and front and rear spacer members 80, 82 on inboard riser 54. Conventional bolts 83 extend from the movable track 42 to mount the seat cushion 22 thereon.

Figure 3:
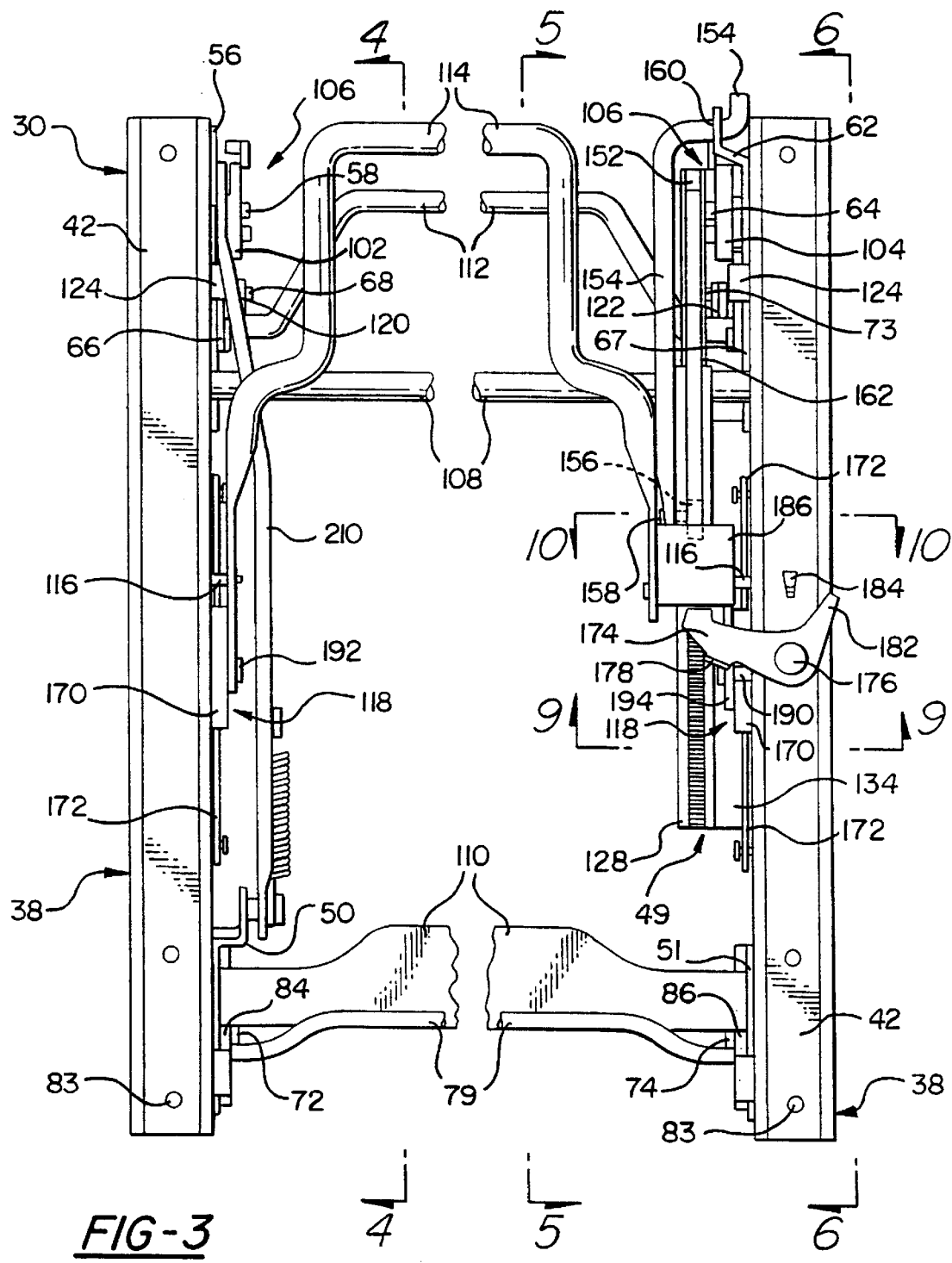
FIG. 3 is a fragmentary sectional plan view of the seat assembly taken along line 3—3 of FIG. 2 with a seat cushion and the seat back removed.

As best seen in FIG. 3, the seat riser 28 includes a front support structure 108 rigidly attached between the risers 53, 54, to reinforce the seat riser 28, a rear support structure 110 rigidly attached between the rear legs 50, 51, and a front leg release handle 112 rigidly secured between the front latches 66, 67. A track release handle 114 is pivotally mounted on supports 116 mounted on the movable tracks 42 and engage the track locking device 118 on the lockable tracks 38 to unlock the movable tracks 42 from the fixed tracks 40. The locking device 118 is disposed on the adjustment mechanism 30 for selectively locking the adjustment mechanism 30 and the seat cushion 22 to the seat riser 28.

Coil springs 120, 122 are mounted, respectively, on rivets 68, 73 and engage the front leg release handle 112 to bias the front latches 66, 67 in a latching direction toward and into latching engagement with the forward anchors 32.

When the vehicle seat assembly 20 is in the operative position, two cylindrical stop members 124, secured to the risers 53, 54, respectively, cooperate with upper straight edge portions 126 on the front latches 66, 67 to prevent the latches 66, 67 from being released from the forward anchors 32.

Figure 7:
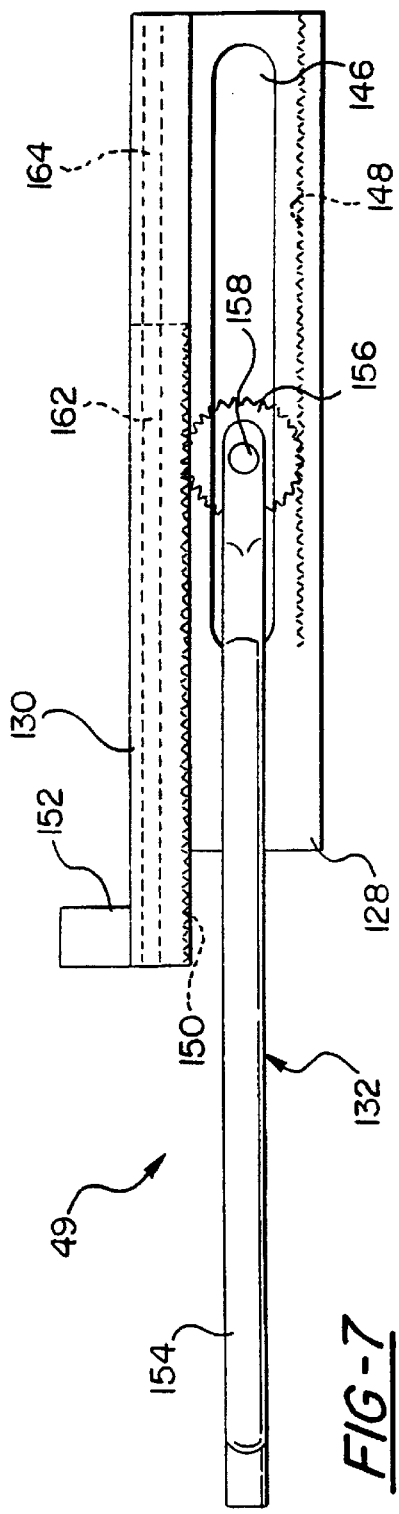
FIG. 7 is an isolated side view of a release mechanism constructed according to the principles of the subject invention.
Figure 8:
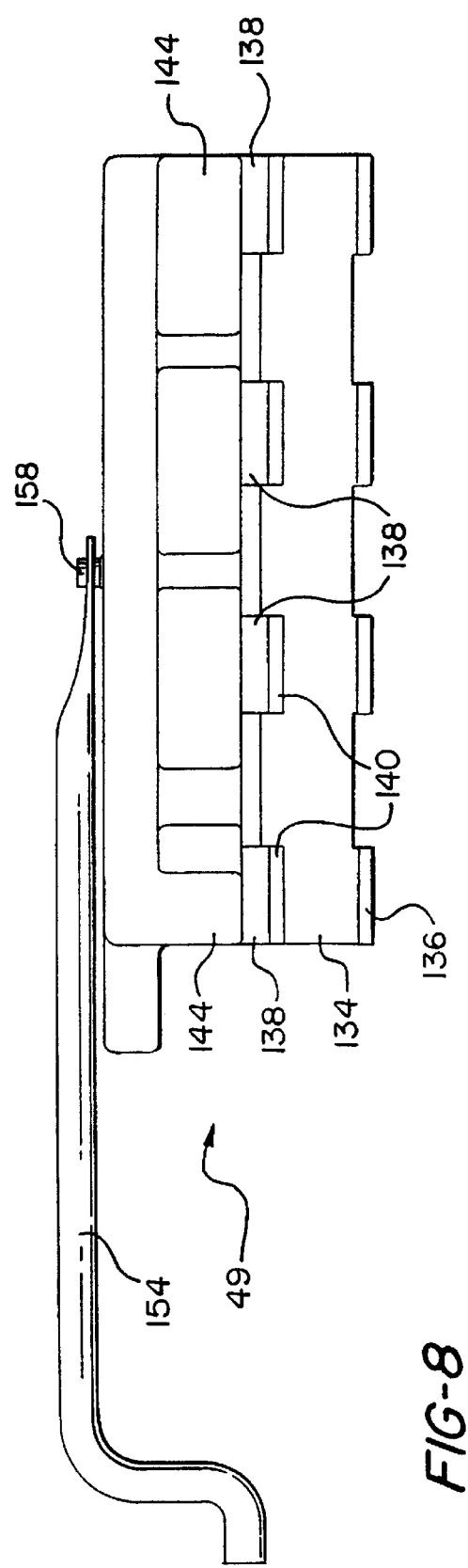
FIG. 8 is a bottom view of the release mechanism of FIG. 7.

The release mechanism 49 is shown in FIGS. 3, 5, 6, 12, 13, 14, 16 and 18 mounted on the inboard riser 54 of the seat riser 28. In other words, the release mechanism 49 is mounted to the interior side of the inboard riser 54. The release mechanism 49 is also shown in cross-section mounted on the inboard riser 54 in FIGS. 9 and 10 and in isolation in FIGS. 7 and 8. The release mechanism 49 includes a housing 128, a movable portion 130 and a pinion gear mechanism 132. The housing 128 is mounted to the seat riser 28 for supporting the release mechanism 49 near the adjustment mechanism 30 and the locking device 118. The moveable portion 130 is movably mounted within the housing 128 between a disengaged position spaced from the locking device 118 and an engaged position abutting the locking device 118. The pinion gear mechanism 132 is coupled to the movable portion 130 for slideably moving the movable portion 130 between the disengaged and engaged positions. The housing 128 and the movable portion 130 are preferably each integral structures preferably made of a molded plastic such as Dupont DELRIN or preferably Nylon 101.

Figure 9:
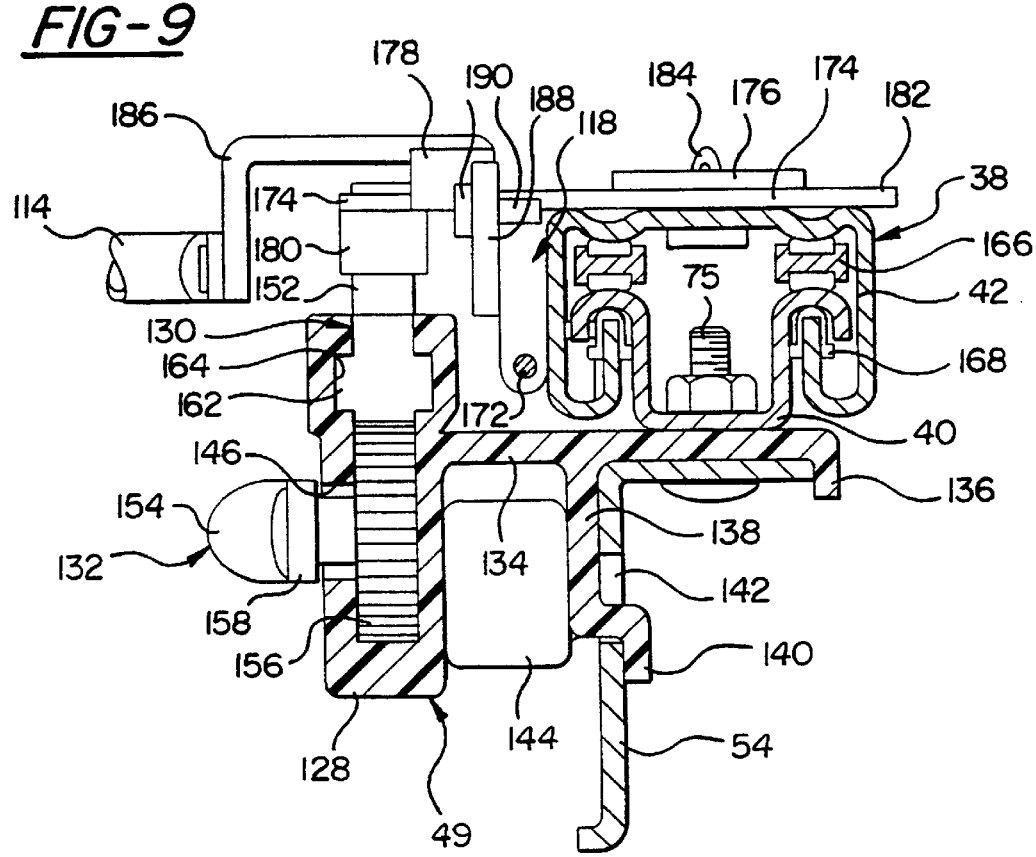
FIG. 9 is a partially cross-sectional view of the seat assembly taken along line 9—9 of FIG. 3.
Figure 10:
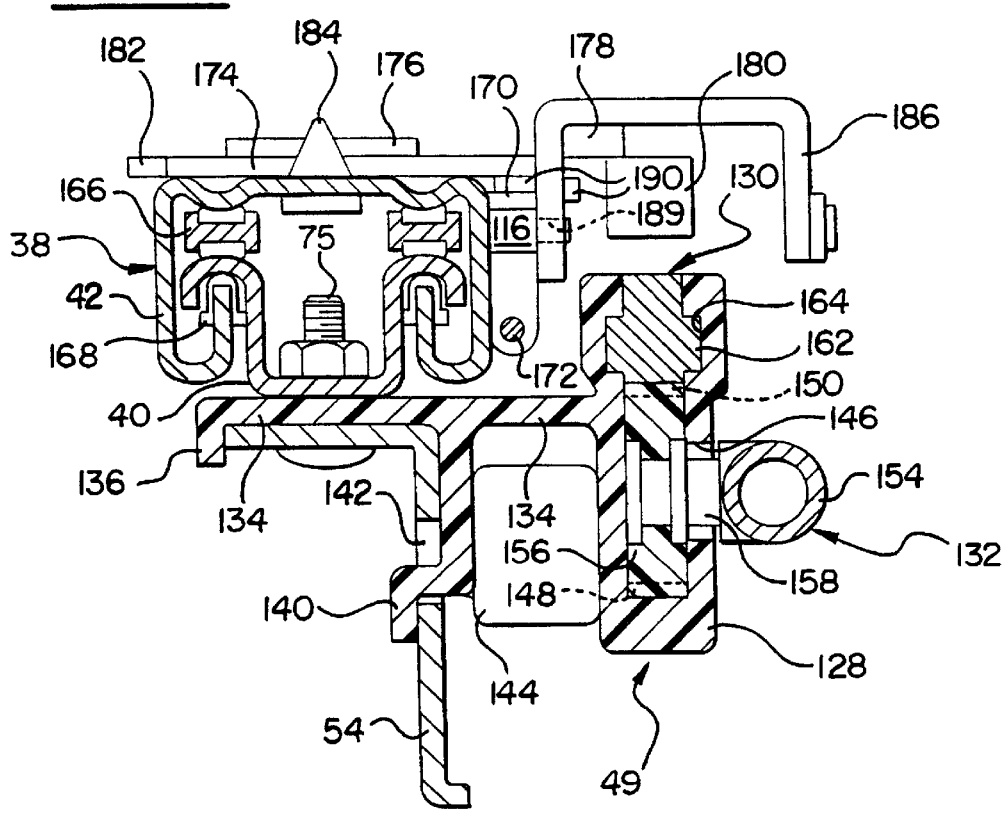
FIG. 10 is a partially cross-sectional view of the seat assembly taken along line 10—10 FIG. 3.

A planar structure 134 formed on the housing 128 is secured between the fixed track 40 mounted on the inboard riser 54 and a top surface of the inboard riser 54 as best seen in FIGS. 9 and 10 to rigidly mount the housing 128 on the seat riser 28. A plurality of integral first legs 136 hookingly engage the inboard riser 54. A plurality of downwardly extending second legs 138 each terminate in hook-like structures 140 to engage a plurality of square apertures 142 in the inboard riser 54. The first and second legs 136, 138 cooperate to snap-fit the housing 128 on the second side 54 of the seat riser 28 to help facilitate the mounting of the fixed track 40 and to hold the housing 128 on the seat riser 28. The planar structure 134 on the housing 128 maintains the housing 18 in spaced relation with the inboard riser 54 and plurality of rectangular box-like structures 144 integrally formed on the housing 128 are in contact with the inboard riser 54 and provide lateral support for the housing 128.

The housing 128 has an oval slot 146 and a series of integral teeth 148 formed adjacent the slot 146. The movable portion 130 is movably disposed in the housing 128 and is provided with a series of teeth 150 and an upwardly extending finger structure 152. The projecting finger 152 engaging the locking device 118 when the moveable portion 130 is in the engaged position. As shown in FIGS. 9 and 10, the movable portion 130 has side extensions 162 that are received within grooves 164 in the housing 128 to slidably mount the movable portion 130 in the housing 128.

The pinion gear mechanism 132 comprises an actuation rod 154 and a pinion gear 156 rotatably mounted on the rod 154 by a spacer rivet 158. The gear 156 is coupled to the teeth 150 of the movable portion 130 for moving the movable portion 130. The actuation rod 154 has a first end mounted to the gear 156 and a second end mounted to one of the front seat supports 56, 62 such that movement of the seat assembly 20 toward the tumbled position moves the housing 128 about the pinion gear mechanism 132 which rotates the gear 156 and slideably moves the movable portion 130. The actuation rod 154 and rivet 158 are preferably made of steel and the gear 156 is a molded plastic structure preferably made of Nylon 101, although Dupont DELRIN could also be used.

The gear 156 is rollingly disposed in the housing 128 and engages the teeth 148 in the housing 128 and the teeth 150 on the movable portion 130. The forward end of the actuation rod 154 is shaped to pivotally engage an aperture 160 in the second front leg 62 so that when the seat riser 28 is tumbled forward, the gear 156 is driven rearwardly with respect to the housing 128.

FIGS. 9 and 10 show the movable track 42 interengaged with the fixed track 40. A plurality of rollers 166 and guide structures 168 facilitate the sliding engagement between the fixed tracks 40 and the movable tracks 42. A lock mounting structure 170 or lock plate 170 is disposed on each movable track 42 and is part of the track locking device 118 on each pair of tracks 40, 42. In other words, the locking device 118 includes a lock plate 170 selectively engaging the adjustment mechanism 30 to selectively lock the adjustment mechanism 30. One of the lock plates 170 is shown in FIGS. 9 and 10. The lockable tracks 38 are unlocked by moving both the lock plates 170 on the tracks 40, 42 from a locking position downwardly against the spring force provide by a plurality of spring arms 172 to a releasing position. When the lockable track 38 are unlocked, the movable tracks 42 can move fore and aft with respect to the fixed tracks 40. The details of the track structure and operation of the cooperating tracks 40, 42 and the track locking device 118 are fully disclosed in U.S. Pat. No. 5,741,000, issued Apr. 21, 1998, and entitled "Vehicle Seat Track Assembly" which is hereby incorporated by reference in its entirety into the present application and will not be considered further herein.

When the movable portion 130 is moved rearwardly, the finger structure 152 impacts a pivoting lever 174 to unlock and then rearwardly move the seat cushion 22. The pivoting lever 174 is pivotally mounted by a rivet 176 on the movable track 42 on the inboard riser 54. The lever 174 has an upwardly extending portion 178, a downwardly extending portion 180 and an arm portion 182. A stop structure 184 struck from the movable track 42 limits the pivotal movement of the pivoting lever 174 in a lock releasing direction.

A U-shaped bracket member 186 is provided on the release handle 114 to engage the lock plate 170 on the inboard riser 54 of the seat riser 28. The support 116 on the adjacent movable track 42 extends through an aperture 189 in the bracket member 186 to pivotally mount the handle 114 to the lockable track 38. An arm 188 extends rearwardly from the bracket member 186 and engages the lock plate 170 through a first lock release pin 190. The arm 188 has an upward camming edge 194 and a lower abutment surface (not numbered) such that the lower abutment surface selectively engages the lock plate 170 to unlock the adjustment mechanism 30. The finger 152 of the movable portion 130 engages the downward portion 180 to rotate the pivoting lever 174 and move the upward portion 178 into engagement with the camming edge 194 of the arm 188 which pushes the arm 188 into engagement with the lock plate 170 to unlock the adjustment mechanism 30. As best seen in FIG. 3, the first lock release pin 190 engages the top surface of the adjacent lock plate 170 to depress the same when the release handle 114 is actuated by lifting the forward portion thereof. A second lock release pin 192 is secured to the handle 114 and engages a central bore in the adjacent lock plate 170 of the outboard riser 53 of the seat riser 28.

OPERATION

The seat assembly 20 is shown in the latched and operative position, i.e., the seating position, in FIGS. 1, 4, 5 and 6. The seat cushion 22 can be adjusted fore and aft by manually unlocking the lockable tracks 38 with the track release handle 114. When the handle 114 is lifted from an equilibrium position to an actuated position, the handle 114 pivots about supports 116 and the pins 190, 192 on the handle 114 move the lock plates 170 downwardly to unlock the tracks 38.

The seat cushion 22 and seat back 24 can then be moved together into a multiplicity of operative positions including a multiplicity of forward operative positions spaced forwardly of a rearward operative position. The looping of the bowden wire cable 48 provides sufficient length of the wire cable 48 to allow fore and aft movement of the seat cushion 22 without interference. When the handle 114 is released, the spring arms 172 return the handle 114 to its equilibrium position and relock the lockable tracks 38. As discussed above, the incremental adjustment of the seat assembly 20 including the details of the track locking device 118 is known in the art.

If the seat cushion 22 is in a forward operative position when the seat assembly 20 is tumbled forward to the storage position, the seat cushion 22, the movable track 42 or the seat back 24 may contact the vehicle floor 36 unless the seat cushion 22 is rearwardly displaced to the rearward operative position thereof before the folding and tumbling operation is completed. The release mechanism 49 is constructed and arranged to unlock the lockable tracks 38 and move the seat cushion 22 and associated structures from a forward operative position rearwardly to the rearward operative position during the tumbling movement so that no portion of the seat assembly 20 contacts the vehicle floor 36.

Figure 11:
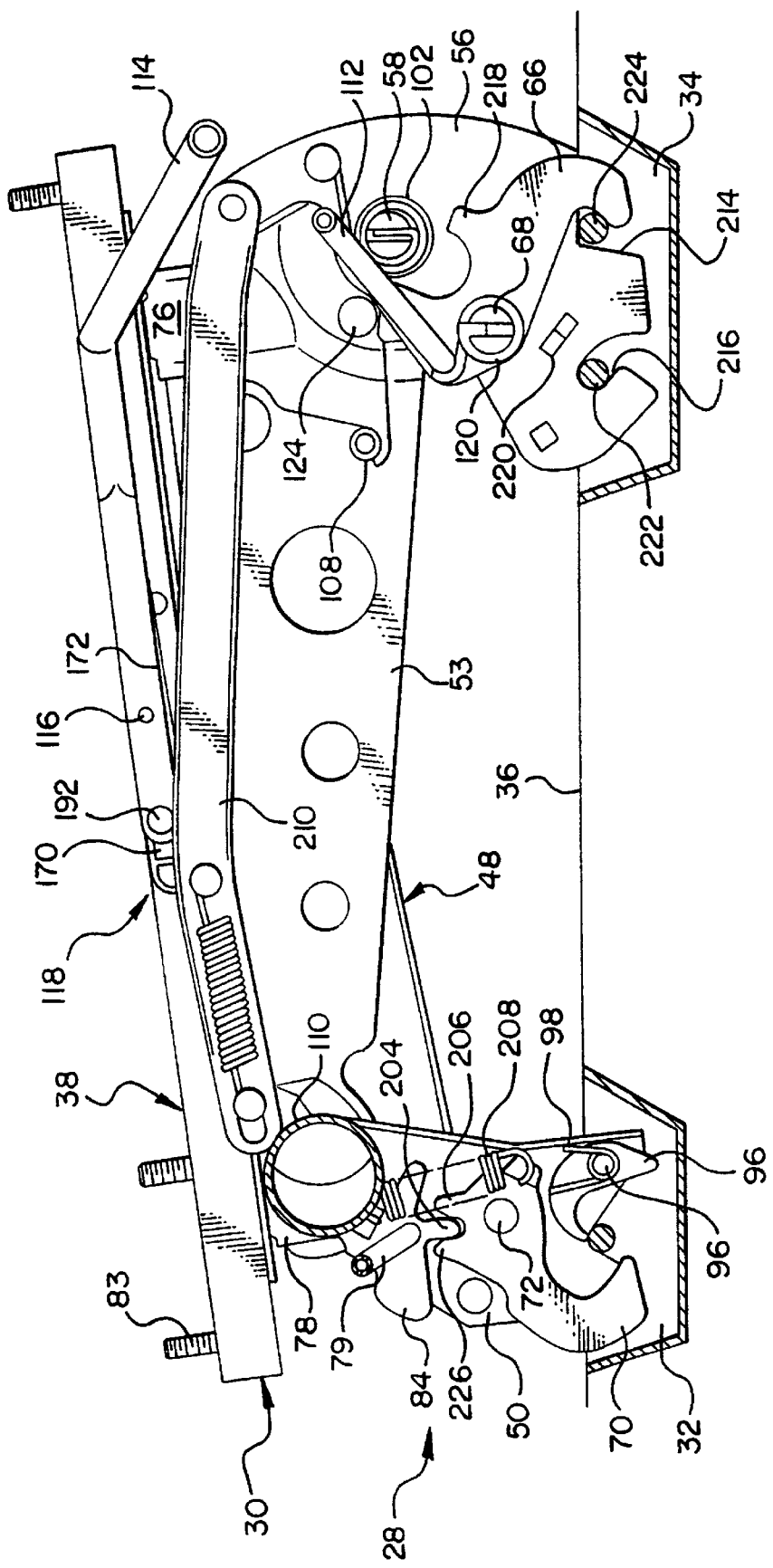
FIG. 11 is a side view of the seat assembly similar to FIG. 4 showing a first rear leg in an unlocked configuration.
Figure 12:
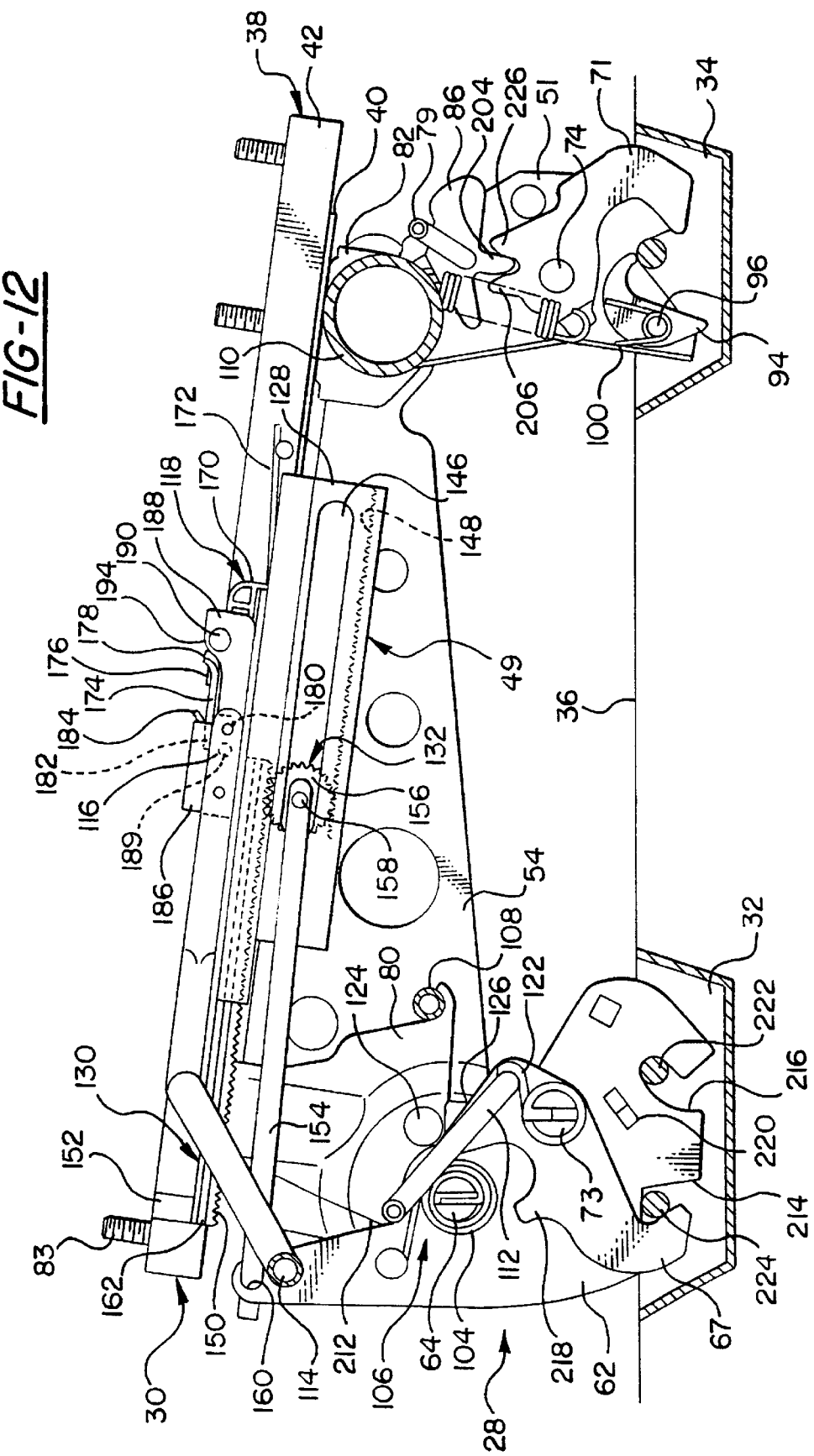
FIG. 12 is a side view of the seat assembly similar to FIG. 5 showing a second rear leg in an unlocked configuration.

To fold and tumble the seat assembly 20, the seat back 24 is first folded into its storage position as shown in FIG. 2. The rear legs are then automatically released from their respective rearward anchors 34 as shown in FIGS. 2, 11 and 12. The seat assembly 20 can then be tumbled to it storage position as will be discussed herein below.

The release handle 44 is used both to fold the seat back 24 and to unlatch the rear legs 50, 51, but the seat back recliner 26 is constructed and arranged to prevent the rear legs 50, 51 from being unlatched until the seat back 24 is folded. More particularly, when the seat assembly 20 is in the operative position, raising the release handle 44 moves the handle 44 in a releasing direction out of engagement with the sector gear 46 so the seat back 24 can be moved into a multiplicity of operative reclining positions within a predetermined recliner operating range.

A blocking device 198 is disposed on the recliner 26 for abutting the release handle 44 when the seat back 24 is in the desired inclination to prevent actuation of the release structures 84, 86 and for allowing the release handle 44 to move such that the release structures 84, 86 may be actuated when the seat back 24 is disposed over the seat cushion 22. Preferably, the blocking device 198 is a pin 198 such that when the seat assembly 20 is in the operative position, the pin 198 is positioned to restrict the movement of the handle 44 in the releasing direction to prevent the bowden wire cable 48 from being actuated.

The release handle 44 is spring biased by a coil spring 196 so that when the handle 44 is released, it pivots in a seat back locking direction to reengage the sector gear 46 and lock the seat back 24 in an operative position within its reclining operating range.

To fold the seat back 24, the release handle 44 is moved in the releasing direction to disengage the handle 44 from the sector gear 46, to unlock the seat back 24 and the seat back 24 is manually pivoted forwardly to the folded position. The seat back 24 is preferably spring-biased by a conventional seat back spring (not shown) forwardly through its recliner operating range toward and into its most erect position, but preferably the seat back spring does not bias the seat back 24 forwardly beyond the most erect position to the folded position.

As shown in FIG. 2, when the seat back 24 is folded, the pin 198 moves with the seat back 24 so that it is no longer positioned to restrict the pivotal movement of the release handle 44 when it moves in the releasing direction. The release handle 44 can then be pivoted an additional distance in the releasing direction through its full actuation stroke to the position shown in solid lines in FIG. 2 to tension the cable in the bowden wire cable 48 to unlock the rear legs 50, 51. The locking or equilibrium position of the release handle 44 is shown in phantom lines in FIG. 2.

The pin 198 is spring-biased downwardly in a slot 200 in the seat back 24 so that when the seat back 24 is an operative position within its recliner operating range, the pin 198 is biased against the bottom of the notch 200 in the seat back recliner 26 to limit the movement of the release handle 44.

When the seat back 24 is folded and the handle 44 is fully actuated, the bowden wire cable 48 pulls the arm 88 of the release structure 84 forwardly which pivots both release structures 84, 86 and the connector member 79 in an unlatching direction to unlatch the rear legs 50, 51 from the rearward anchors 34. As can be appreciated from a comparison, FIGS. 4 and 11 and FIGS. 5 and 12, rearwardly extending portions 204 of the release structures 84, 86 engage integral second extension structures 206 on the rear latches 70, 71 to pivot the latches against the spring force of coil spring 208 out of locking engagement with the rearward anchors 34. As discussed above, the unlatched configuration of the rear legs 50, 51 before tumbling is illustrated in FIGS. 2, 11 and 12.

The clock springs 102, 104 of the spring system 106 tend to tumble the seat forwardly toward the storage position so that the rearward portion of the seat tends to move away from the rearward anchors 34 when the rear legs 50, 51 are unlatched.

When the rear legs 50, 51 are lifted away from the rearward anchor 34, the hairpin springs 98 pivot the stop members 92, 94 into blocking relation with the latches 70, 71 and prevent the rear latches 70, 71 from returning to their latched positions when the handle 44 is released. The stop members 92, 94 hold the latches 70, 71 in an open position until the rear legs 50, 51 are relatched to the rearward anchors 34.

Figure 13:
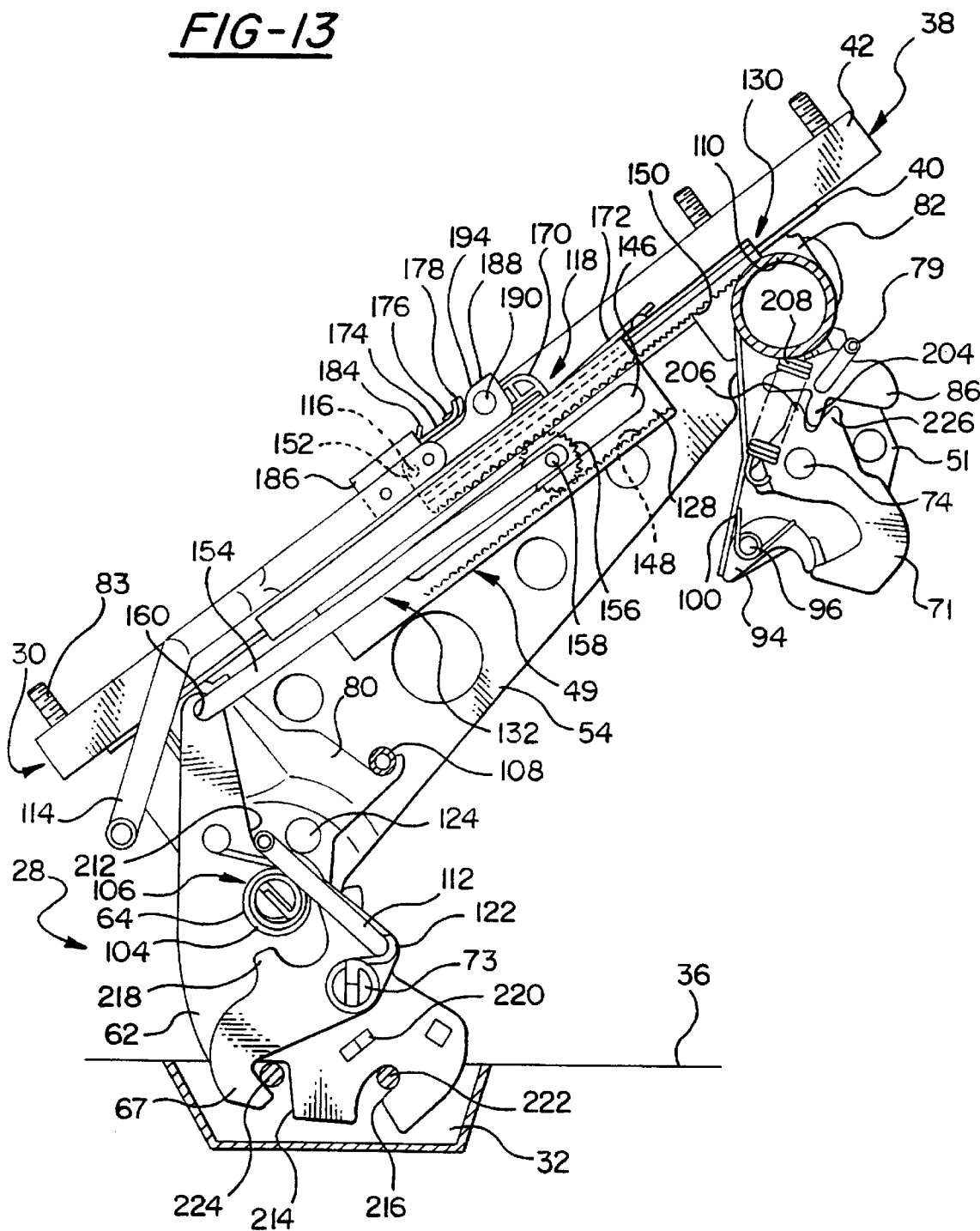
FIG. 13 is a side view of the seat assembly similar to FIG. 5 showing the seat assembly in a partially tumbled position.

FIGS. 13 through 18 illustrate the tumbling movement of the seat assembly 20 to the storage position. These figures indicate that the front legs 56, 62 remain engaged with the forward anchors 32 during the tumbling movement. The housing 128 of the release mechanism 49 tumbles forwardly with the seat riser 28 about the stationary legs 56, 62. Because the free end of the actuation rod 154 is pivotally mounted to the stationary second front leg 62, the drive gear 156 is driven rearwardly with respect to the housing 128 as the tumbling movement occurs which causes the movable portion 130 to move rearwardly with respect to the housing 128. The finger 152 impact the downwardly extending portion 180 of the lever 174 as shown in FIG. 13 and pivots the lever 174 in an unlocking direction to the position shown in FIG. 14.

As the pivoting lever 174 moves in the unlocking direction, the lever 174 cams over the camming edge 194 on the arm 18 of the track release handle 114 to move the handle 114 from its equilibrium position (shown in FIG. 13) to its actuated position (shown in FIG. 14) to unlock the lockable tracks 38. The finger 152 (shown in phantom lines in FIG. 13) moves the lever 174 in the unlocking direction until the arm 182 contacts the stop member 184.

Figure 14:
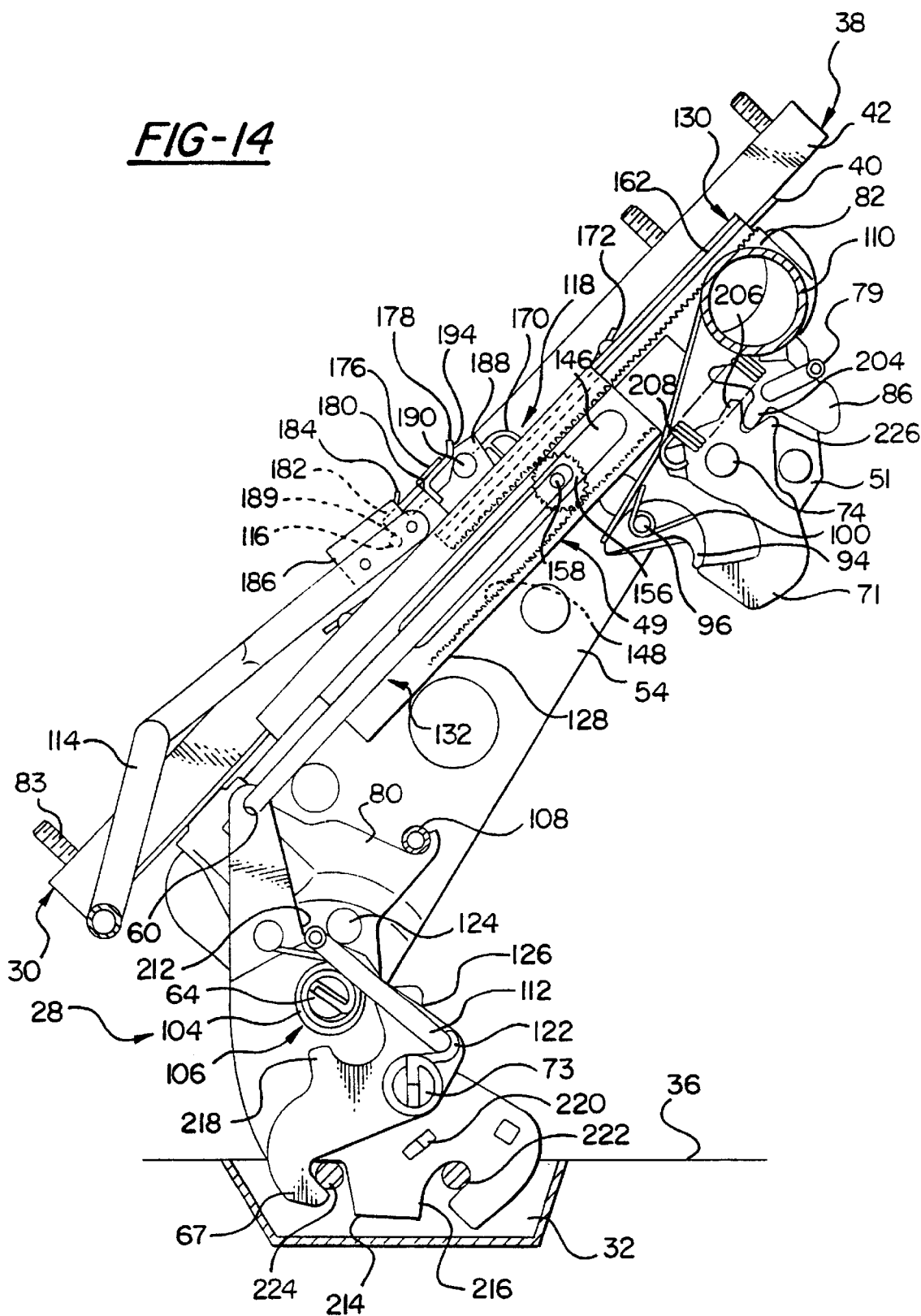
FIG. 14 is a side view of the seat assembly similar to FIG. 13 after the release mechanism has actuated a release handle.
Figure 15:
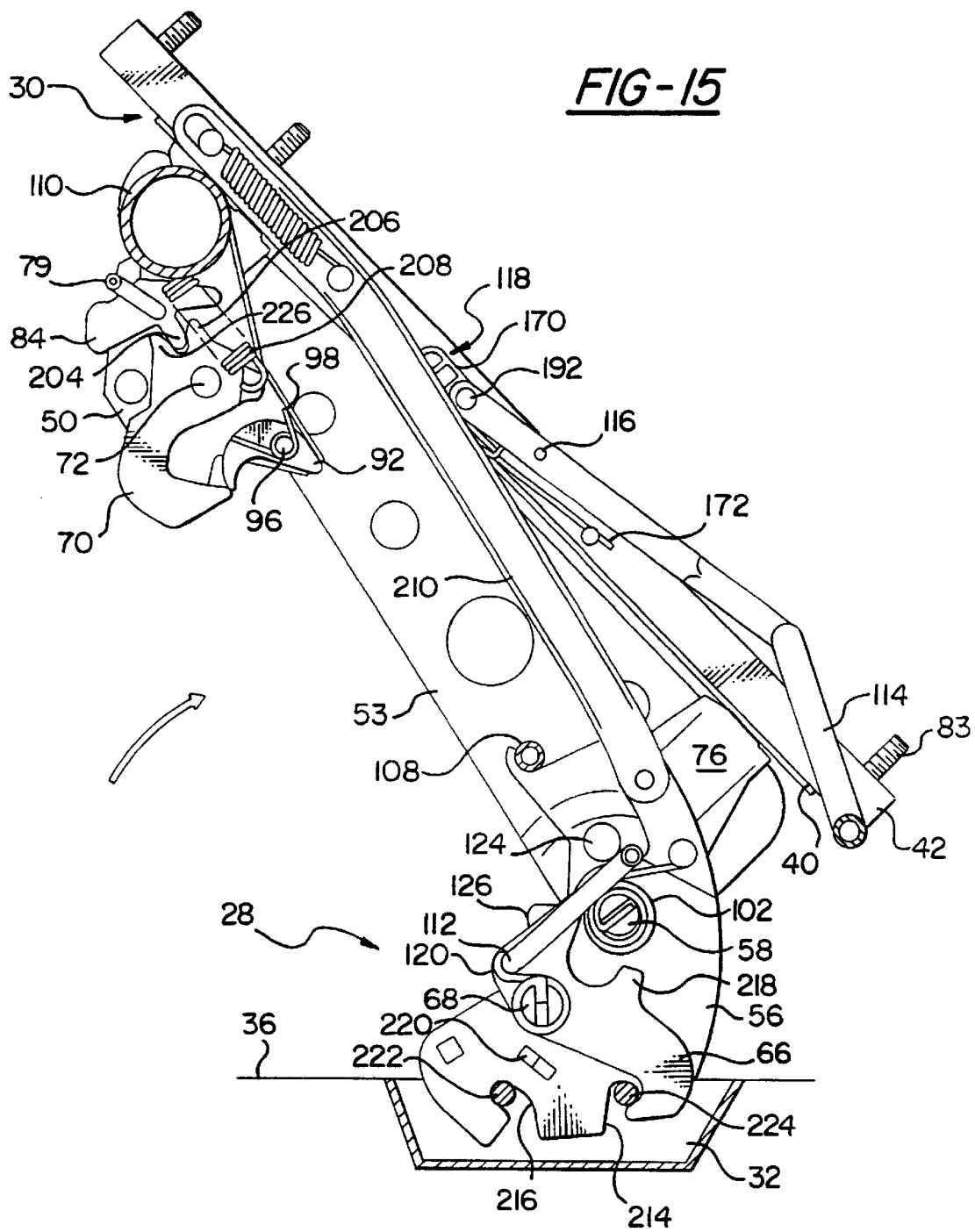
FIG. 15 is a side view of the seat assembly similar to FIG. 4 showing the seat assembly in a partially tumbled position.

The release handle 114 sufficiently rigid to move the lock plate 170 on the outboard riser 53 of the seat riser 28 to its releasing position as indicated by FIG. 15 which shows the configuration of the seat riser 28 and associated structures when the inboard riser 54 is in the position shown in FIG. 14. The adjustment mechanism 30 is now unlocked. Further tumbling of the seat assembly 20 toward the storage position causes the movable portion 130 to move the seat cushion 22 rearwardly to its rearward operative position. Specifically, the drive gear 156 continues to drive rearwardly with respect to the housing 128 which continues to move the movable portion 130 rearwardly. The finger 152 pushes rearwardly on the downwardly extending portion 180 which in turn rearwardly moves the movable tracks 42 rearward relative to the fixed tracks 40.

This rearward movement of the seat cushion 22 prevents any portion of the seat assembly 20 from contacting the vehicle floor 36 during the tumbling operation and interfering with the tumbling movement. A connector arm 210 on the outboard riser 53 of the seat riser 28 is pivotally mounted between the first rear leg 50 and first front leg 56 for moving the rear legs 50, 51 into folded positions (shown in FIGS. 16 and 17) as the seat assembly 20 tumbles to the storage position.

Figure 16:
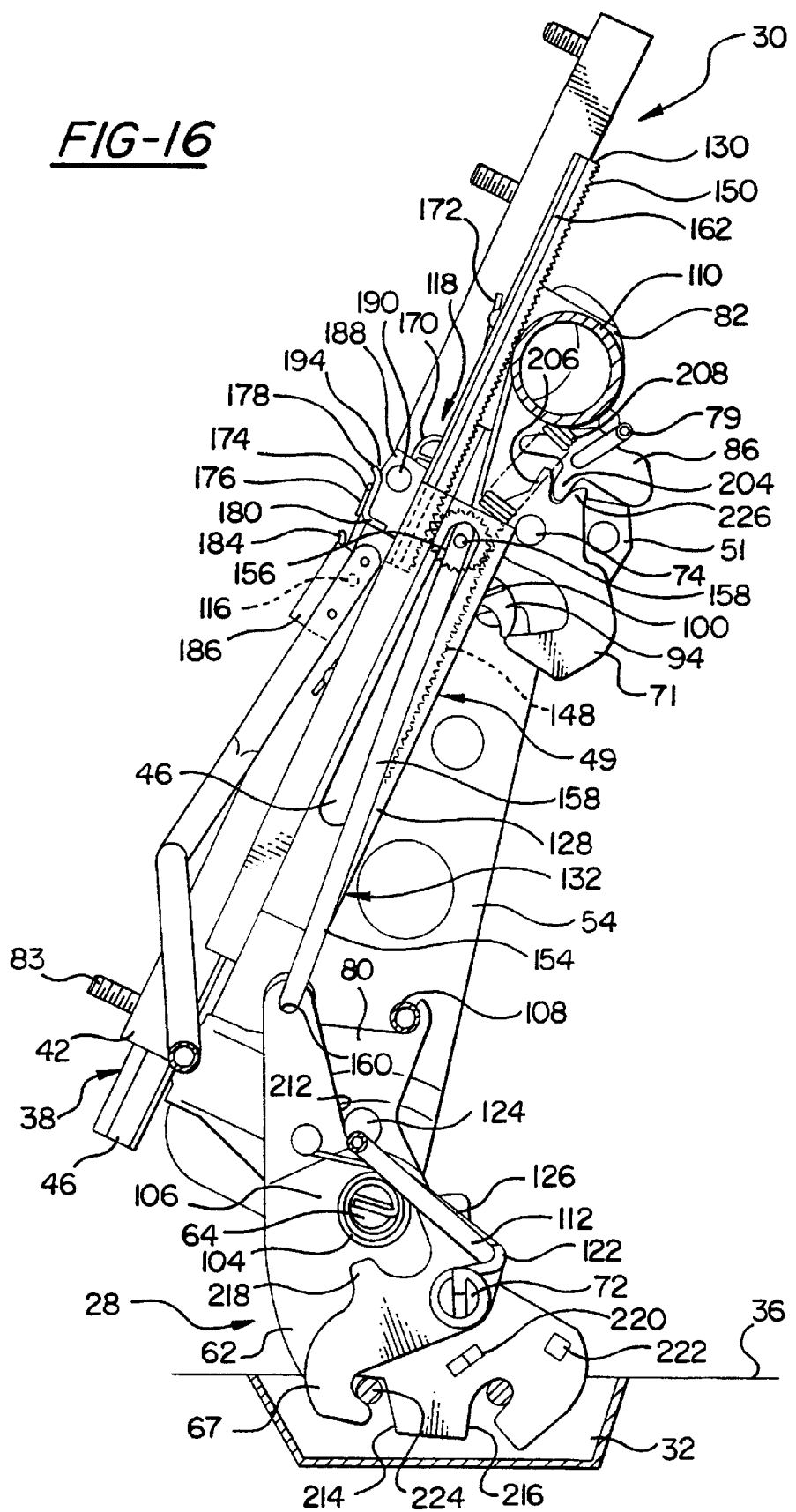
FIG. 16 is a side view of the seat assembly similar to FIG. 5 showing the seat assembly in a fully tumbled position.
Figure 17:
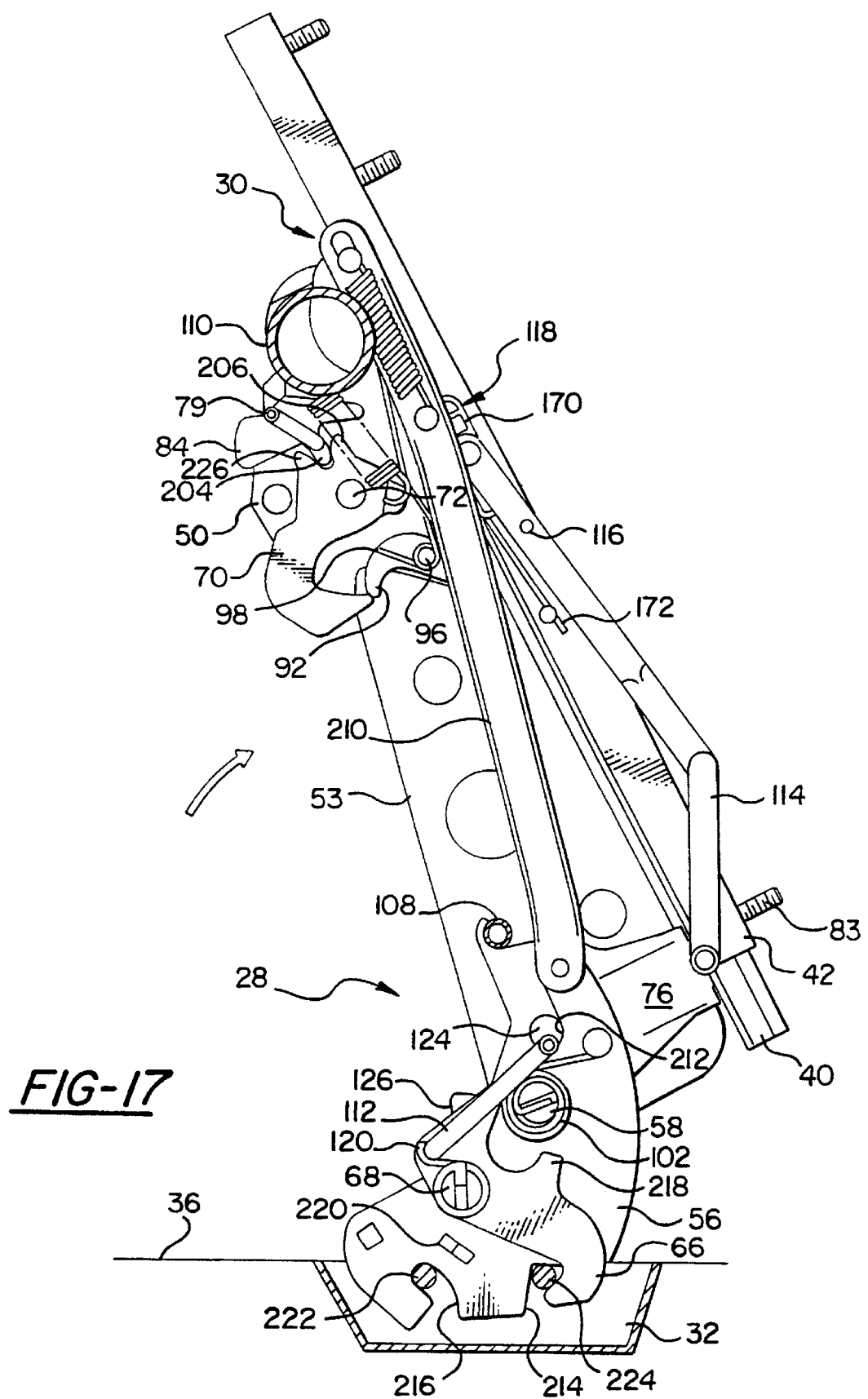
FIG. 17 is a side view of the seat assembly similar to FIG. 4 showing the seat assembly in a fully tumbled position.

FIGS. 16 and 17 show the storage position of the seat riser 28 and associated structures. In this storage position, the seat cushion 22 is in the rearward operative position and the lockable tracks 38 are still unlocked. The seat cushion 22 is retained in the rearward operative position by the pinion gear mechanism 132 which prevents the movable structure 130 from moving forward in the housing 128.

FIGS. 16 and 17 illustrate that the fully tumbled position is realized when the cylindrical stop members 124 on the seat riser 28 engage back edge portions 212 of the two front legs 56, 62. The spring force provided by the spring system 106 tends to maintain the vehicle seat assembly 20 in the tumbled position.

Figure 18:
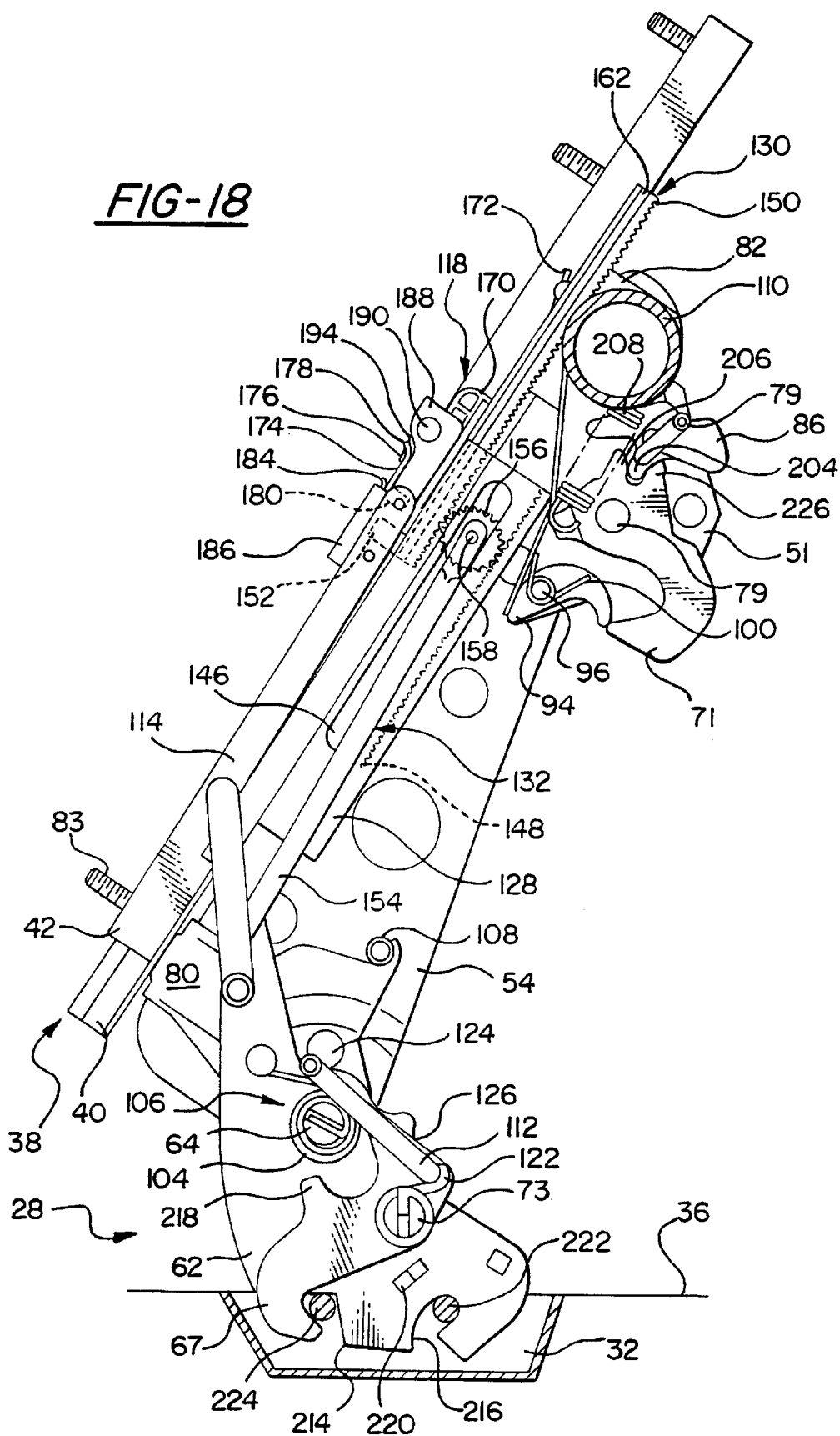
FIG. 18 is a side view of the seat assembly similar to FIG. 5 showing the seat assembly in a partially tumbled position as the seat assembly moves out of the fully tumbled position.

To return the seat assembly 20 to the operative position, the user applies moderate manual pressure to pivot the seat assembly 20 in the rearward direction. This rearward movement moves the gear mechanism 156 forwardly with respect to the housing 128 which, in turn, causes the movable portion 130 to move forwardly within housing 128. The forward movement of the movable portion 130 reduces the biasing force on the pivoting lever 174 which causes the camming edge 194 on the track release handle 114 to cam the pivoting lever 174 forwardly about the rivet 176. The spring force provided by the spring arms 172 returns the release handle 114 to its equilibrium position, relocks the lockable tracks 38 and returns the lever 174 to is fully forwardly pivoted position. The tracks 38 relock the seat cushion 22 in or near the rearward operative position thereof as the vehicle seat assembly 20 is returned to the operative position. FIG. 18 illustrates the seat riser 28 and associated structures as the user begins to return the seat assembly 20 to the operative position. In other words, the gear structure 156 and movable structure 130 have moved forward slightly with respect to the housing 128, the release handle 114 has returned to the normal position and the tracks 38 are relocked.

Figure 19:
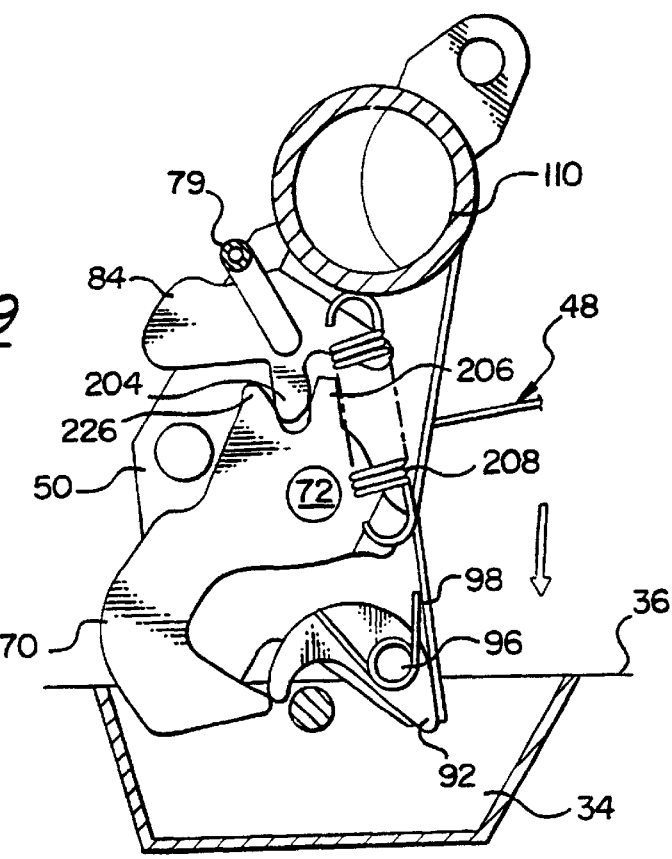
FIG. 19 is a fragmentary sectional view of the first rear leg structure prior to engagement with a rod member in a conventional vehicle floor well structure.
Figure 20:
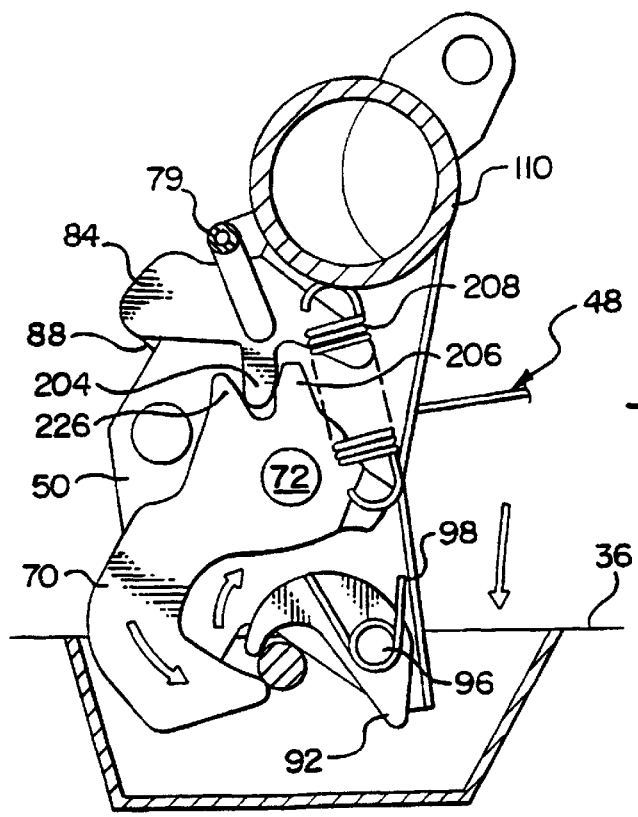
FIG. 20 is a view similar FIG. 19 showing the configuration of the first rear leg structure after engagement with the rod member but prior to relocking therewith.
Figure 21:
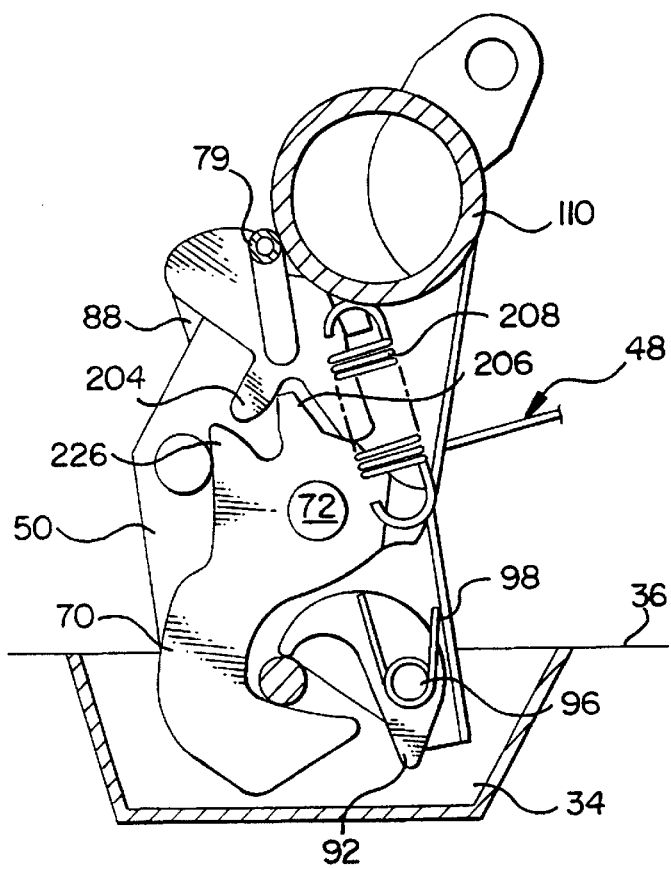
FIG. 21 is a view similar FIG. 19 showing the configuration of the first rear leg structure after relocking with the rod member.

As the seat assembly 20 moves back toward the operative position, the connector am 210 moves the rear legs 50, 51 from their folded positions into their operative positions to reengage the rearward anchors 34. FIGS. 19 through 21 illustrate the reengagement of the rear legs 56, 51 with the rearward anchors 34. This reengagement occurs by simply moving the seat assembly 20 downwardly. There is no need to reactuate the manual release handle 44 to move the rear latches 70, 71 to their unlatched positions because the stop members 2 94 hold them open. Only the first rear leg 50 is shown in FIGS. 19 through 21, but the second rear leg 51 simultaneously relocks with one of the rearward anchors 34 in essentially the same way. Therefore the following description of the first rear leg 50 applies to the second rear leg 51 also.

When the stop member 92 impacts the rearward anchor 34, the stop member 92 moves out of stopping relation with the rear latch 70 so that when the first rear leg 50 impacts the rearward anchor 34, the force provided by the coil spring 208 can move the latch 70 back into locking engagement with the rearward anchor 34. The spring force of the coil spring 208 simultaneously returns the release structure 84, the inner arm portion 88 and the connector member 79 to equilibrium position.

After the seat riser 28 is reengaged with the rearward anchors 34, the seat back 24 is manually pivoted from the storage position to the operative position within the recliner operating range. The release handle 44 is spring-biased to reengage the sector gear 46 to releasably lock the seat back 24 in an operative position.

The front legs 56, 62 remain locked to the forward anchors 32 when the seat assembly 20 is tumbled to the storage position. The front legs 56, 62 can only be unlocked from the forward anchors 32 when the vehicle seat assembly 20 is in the tumbled position. When the seat assembly 20 is in the operative position, the stop members 124 on the seat riser 28 engage of the front latches 66, 67 to prevent movement of the front latches 66, 67 in an unlocking direction. Even though front leg release handle 112 is accessible to the vehicle user when the vehicle seat assembly 20 is in the operative position, the handle 112 cannot be actuated to unlock the front legs 56, 62 from the vehicle floor 36 until the seat assembly 20 is tumbled to move the stop members 124 out of locking engagement with the front latches 66, 67.

Figure 23:
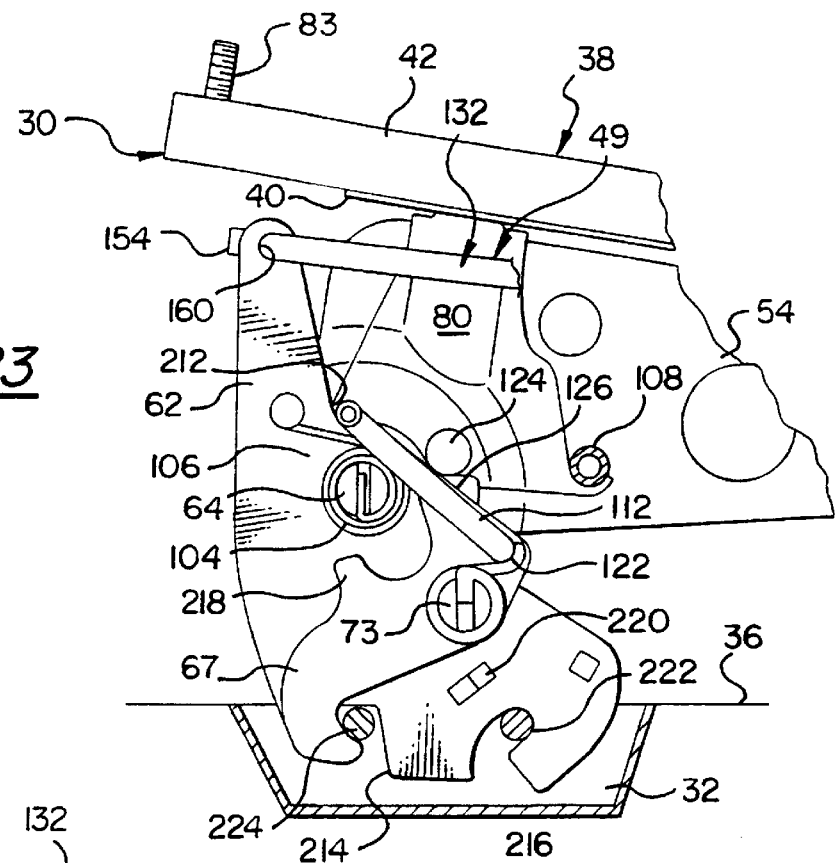
FIG. 23 is a fragmentary sectional view of a second front leg structure showing the second front leg structure in locking engagement with a front well structure.
Figure 24:
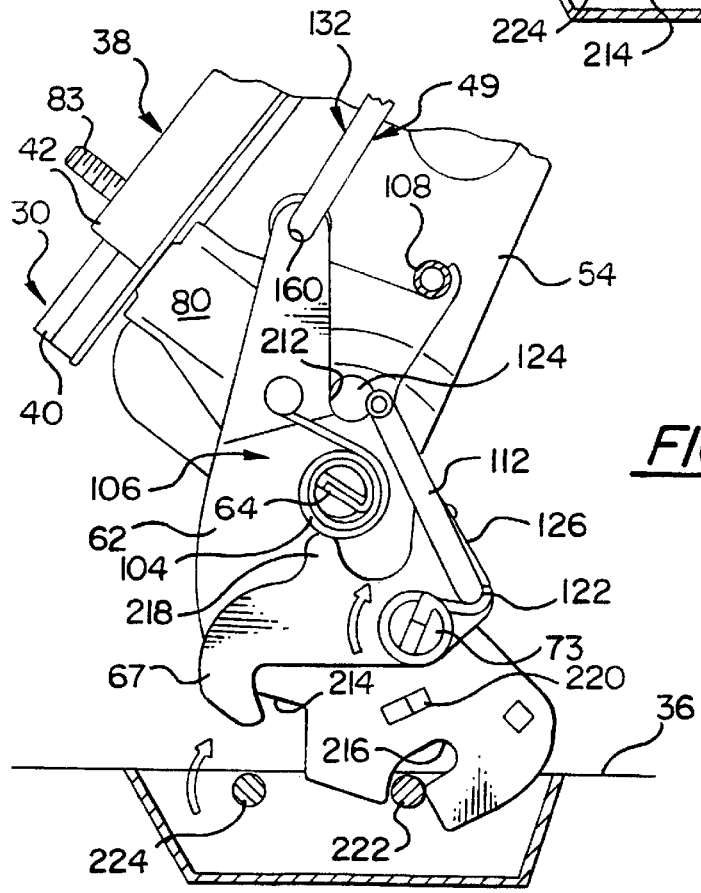
FIG. 24 is a view similar to FIG. 23 showing the second front leg structure out of locking engagement with the front well structure.

FIGS. 23 and 24 illustrate the unlocking and removal of the second front leg 62 from a forward anchor 32. The track release handle 114 is not shown and only a fragmentary portion of the actuation rod 154 of the release mechanism 49 is shown to more clearly illustrate the seat removing operation. It can be understood that the following discussion of the operation and structural features of the second front leg 62 (and associated structures) applies to the first front leg 56 (and associated structures) as well because the lower portions of the front legs 56, 62, including a v-shaped notch 214 and a rearwardly extending notch 216, are mirror images and because the latches 66, 67 pivot together because they are both secured to the front release handle 112.

FIG. 23 shows a portion of the seat riser 28 in the operative position and the second front leg 62 in the locked position. The second front leg 62 cannot be unlocked because the stop member 124 is engaged with the latch 67. Tumbling the seat assembly 20 moves the stop member 124 out of stopping relation with the latch 67. The front leg release handle. 112 can now be moved in an unlatching direction to unlatch the front leg 62. A directional arrow in FIG. 24 indicates the unlatching direction. Contact between a stop structure 218 on the latch 67 and rivet 64 limits the pivoting movement of the handle 112 in the unlatching direction. A comparison of FIGS. 23 and 24 indicates that when the seat assembly 20 is removed, it is in the fully tumbled configuration and the release mechanism 49 has moved the seat cushion 22 to the rearward operative position.

When the seat assembly 20 is removed and the front leg release handle 112 is released, the coil spring 122 tends to pivot the handle 112 in a latching direction until a front edge portion is stopped against a tab portion 220 struck from the front leg 62.

To reinstall the seat assembly 20, the rear notch 216 is placed on a rearward rod member 222 of the forward anchor 32 and the front leg release handle 112 is moved in the unlatching direction so that a forward rod member 224 can enter the notch 214. The handle 112 is released and the coil spring 122 moves the latch 67 in latching direction to relatch the seat assembly 20 to the forward anchor 32. The seat assembly 20 is then returned from the storage position to the operative position in the manner described above. A camming action between the stop member 124 and the straight edge 126 on the latch 67 cams the latch 67 into full locked engagement with the forward rod member 224 as the seat assembly 20 returns to the operative position.

Figure 22:
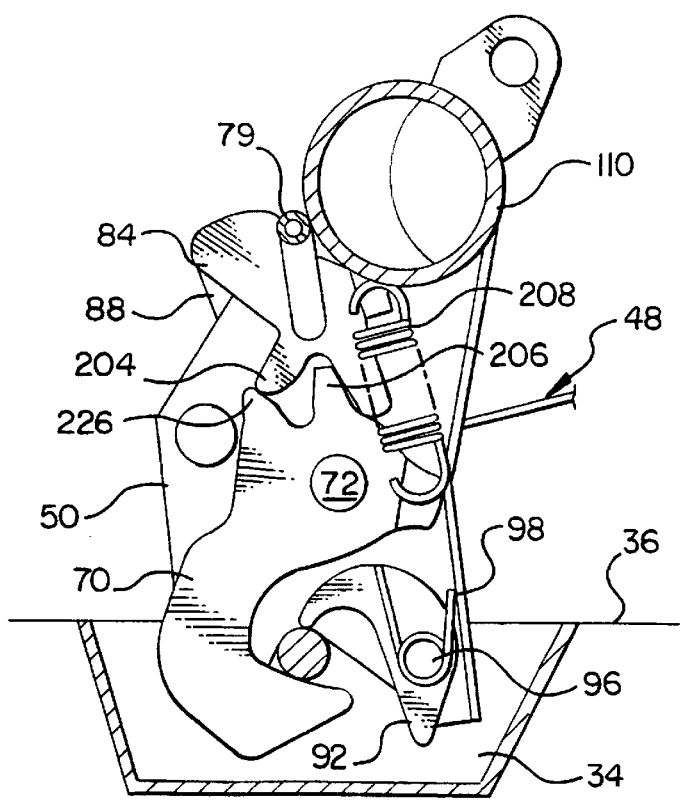
FIG. 22 is a view similar FIG. 19 showing the configuration of the first rear leg structure after relocking with the rod member when the vehicle is in a sudden stop situation.

FIG. 22 illustrates a sudden stop situation when the seat assembly 20 is in the operative position. Only the first rear leg 50 is shown, but the discussion applies to the second rear leg 51 as well. Cooperation between the release structure 84 and the latch 70 prevents the seat from being disengaged from the rearward anchor. Specifically, contact between the rearward extension portion 204 on the first release structure 84 and a first extension structure 226 on the latch 70 prevents the latch from moving in an unlatching direction and the rear leg 50 from becoming unlatched from the rearward anchors 34 in the event of a sudden stop of the vehicle.

Figure 25:
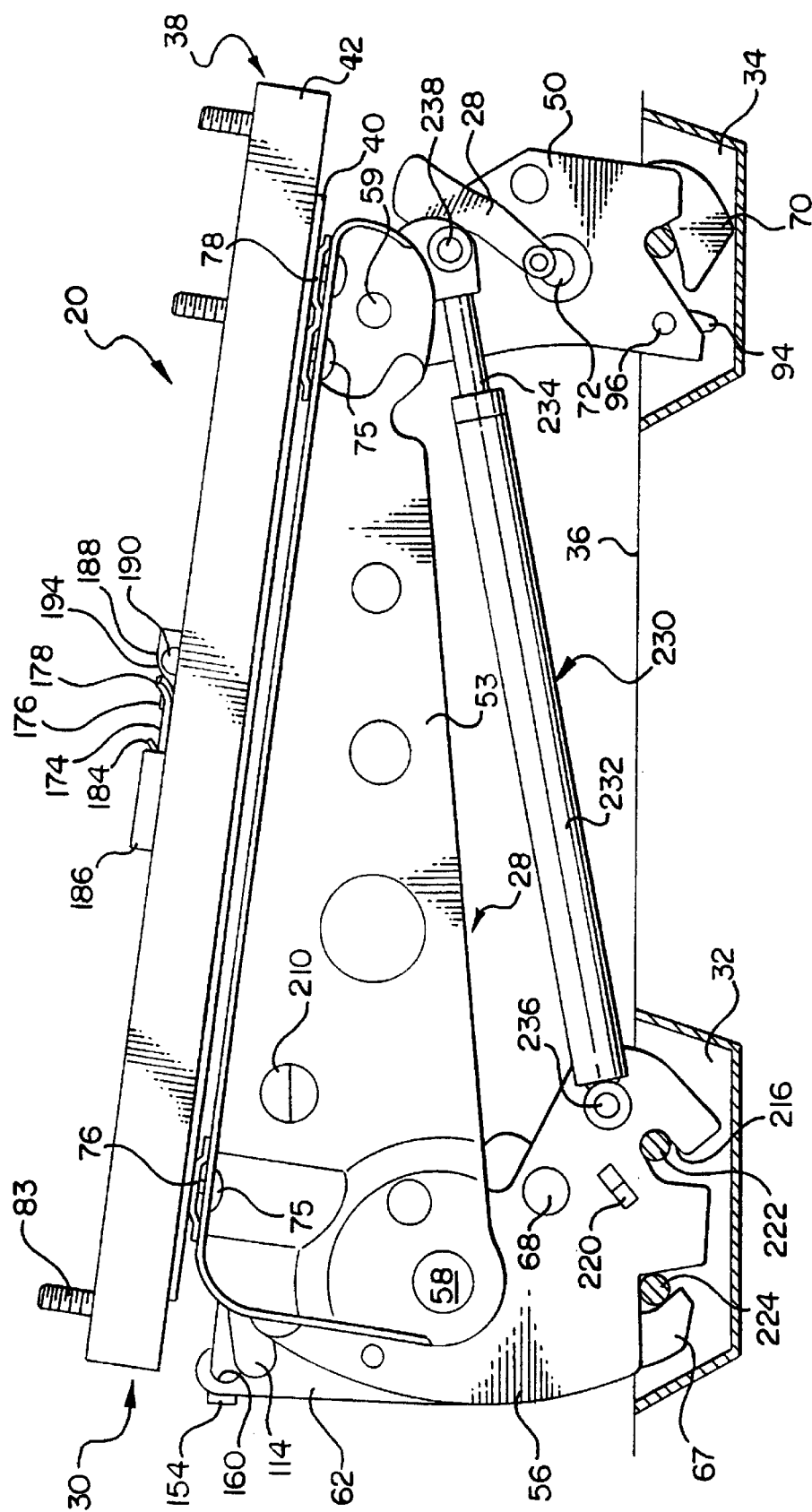
FIG. 25 is side elevational view of an alternative embodiment of the seat riser showing a gas strut incorporated therein.

FIG. 25 shows an alternative embodiment of the vehicle seat assembly 20 that includes a conventional gas strut 230 mounted on the outside of the seat riser 28. The seat cushion 22, the seat back 24, the seat back recliner 26 and the bowden wire cable 48 of the seat assembly 20 are not shown. Structures on the seat assembly 20 of the preferred embodiment that are similar to structures on the seat assembly 20 of this alternative embodiment are given like reference numerals. The gas strut 230 comprises a housing 232 and a spring-biased piston member 234 slidably disposed in the housing 232. The housing 232 is pivotally mounted to the first front leg 56 by a rivet 236 and the piston member 234 is pivotally mounted on a rearward portion of the outboard riser 53 of the seat riser 28 by a rivet 238.

Figure 4:
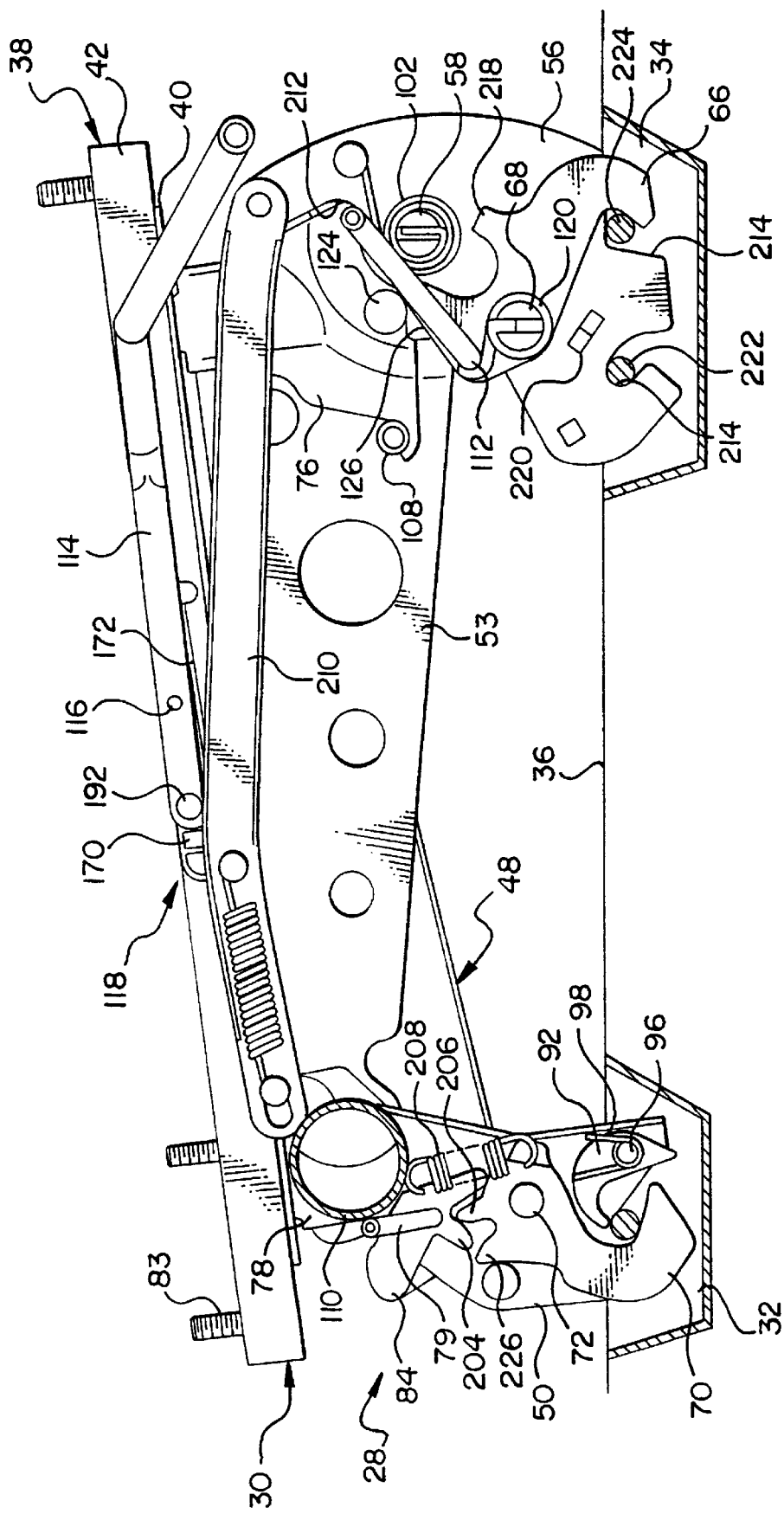
FIG. 4 is a partially cross-sectional side view of the seat assembly taken along line 4—4 of FIG. 3.
Figure 5:
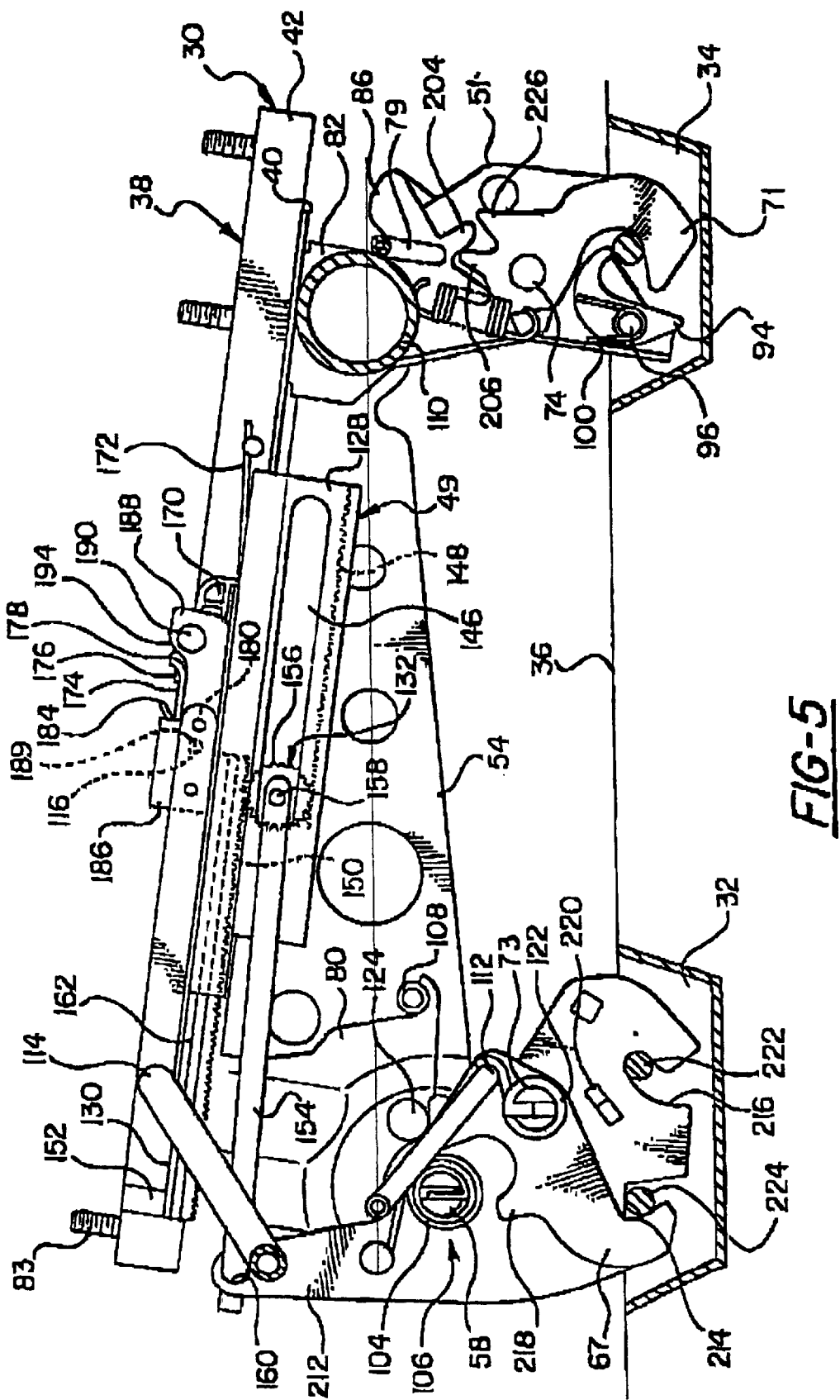
FIG. 5 is a partially cross-sectional side view of the seat assembly taken along line 5—5 of FIG. 3.
Figure 6:
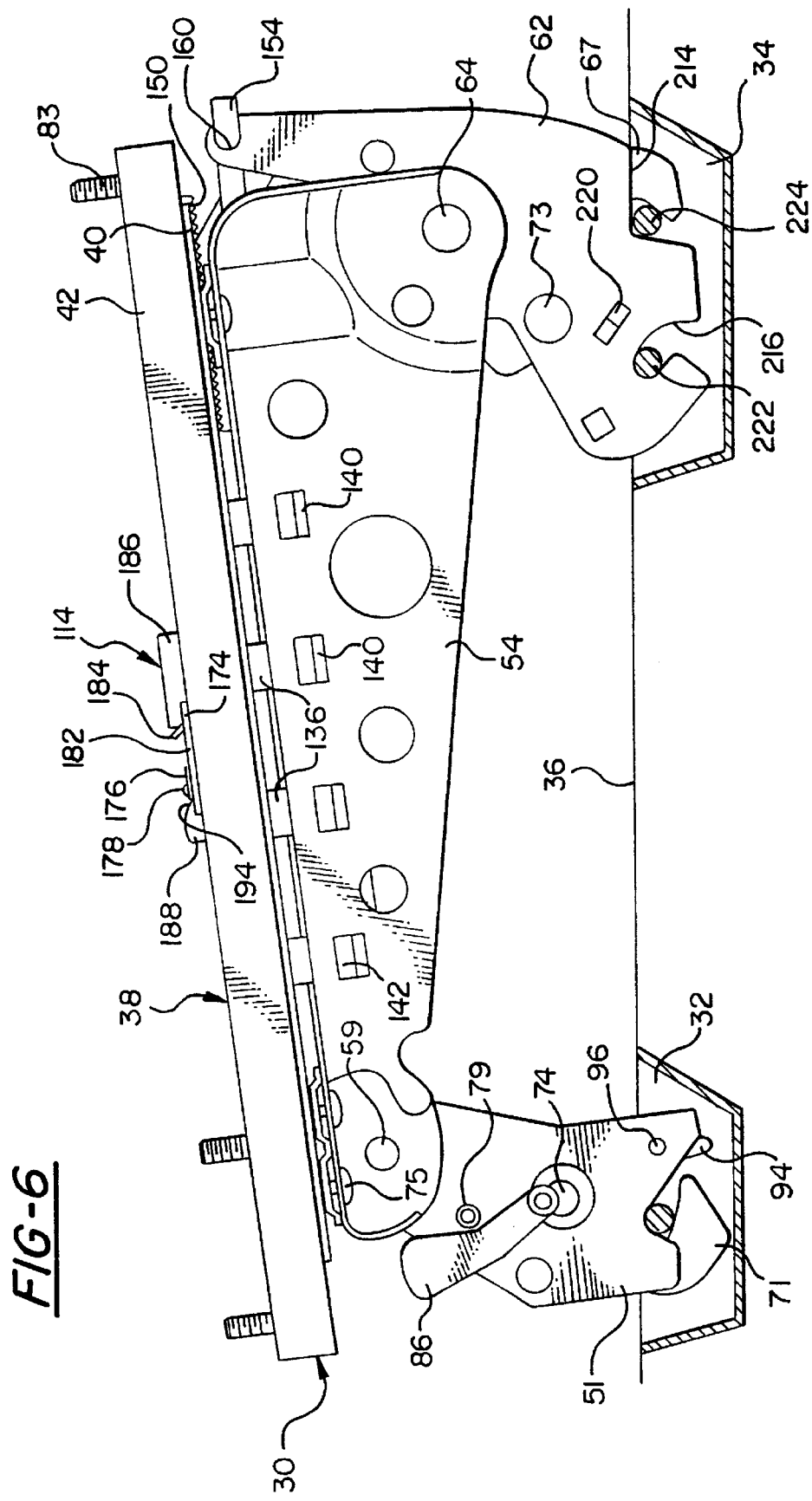
FIG. 6 is a side view of the seat assembly taken along line 6—6 of FIG. 3.

The optional conventional gas strut 230 can be used with clocktype springs 102, 104 mounted as shown, for example, in FIGS. 4 and 5 to provide sufficient spring force to tumble the seat assembly 20 to the storage position without manual assistance regardless of the starting position of the seat cushion 22 and without pivoting the seat assembly 20 at an excessive speed or, alternatively, the gas strut 230 can be used alone without any other springs to provide assistance in tumbling the seat assembly 20.

Because the release mechanism 49 (not visible in FIG. 25) unlocks the cooperating tracks 38 and moves the seat cushion 22 to the rearward operative position during the tumbling operation, the torsional force required to fully tumble the seat will vary depending on the rearward distance the seat cushion 22 which must be moved during the tumbling operation. The farther forward the seat cushion 22 when the tumbling operation begins, the greater the torsional force required to fully tumble the seat assembly 20. When the clock springs 102, 114 are used alone to provide the spring force, the springs 102, 104 are preferably constructed and arranged to provide enough to fully tumble the seat assembly 20 at a safe rate of speed when the seat cushion 22 is in the rearward operative position prior to tumbling. If the springs 102, 104 are constructed to be powerful enough to fully tumble the seat assembly 20 when the seat cushion 22 is in a forward operative position, the seat assembly 20 may tumble too rapidly if the seat cushion 22 in or near the rearward operative position immediately prior to the commencement of the tumbling operation.

Excessively rapid tumbling is undesirable because it may injure the vehicle user. This means however, that when the seat cushion 22 is positioned fully or partially forward of the rearward operative position when tumbling commences, the spring 102, 104 alone may not provide sufficient spring-force to fully tumble the seat assembly 20.

Conventional gas strut structure such as strut 230 provide great spring force at a controlled speed because a controlled fluid flow occurs within the gas strut 230 in a well known manner as the piston member 234 moves linearly out of the housing 232 which moderates the rate of this movement.

The piston members of some conventional gas struts must be slightly pulled out of the housing before the spring mechanism is actuated. Once actuated, the spring mechanism will linearly displace the piston member outwardly from the housing at a predetermined rate. When the strut 230 is of this type and is used in combination with the clock springs 102, 104, the clock springs 102, 104 can be constructed to provide the initial movement required to actuate the strut 230. Once actuated, the gas strut 230 will fully tumble the seat assembly 20 at a controlled rate of speed regardless of the initial position of the seat cushion 22.

Alternatively, if the strut 230 is of this type and is used alone without the springs 102, 104, the user may need to manually tumble the seat assembly 20 a short distance to actuate the strut 230. Therefore it is contemplated to use the gas strut 230 alone or with the additional spring structures such as the clock springs 102, 104. The gas strut 230 provides increased and controlled torsional force, but may result in greater vehicle weight and seat construction cost.

The embodiments of the vehicle seat assembly 20 illustrated and described herein are exemplary only and variations of the structure of the seat assembly 20 are envisioned. For example, the vehicle seat assembly 20 is shown provided with a single manual release handle 44 which serves two functions: 1) the handle 44 unlocks and relocks the seat back 24 to adjust the reclining position and to fold the seat back 24; and 2) the handle 44 unlocks the rear legs 50, 51 from the rearward anchors 34. As described above, this single handle 44 moves through a portion of its full stroke to unlock the seat back 24 for reclining adjustment and folding movement and is prevented from moving through its full stroke to unlock the legs 50, 51 until the seat back 24 is folded.

An alternative embodiment is contemplated which provides two separate handles (not shown) including a first handle that controls the reclining and folding action of the seat back 24 and a second handle that controls the unlocking of the rear legs 50, 51. When two handles are provided, a first two handle embodiment is contemplated, in which the handles operate interdependently or, alternatively, a second two handle embodiment could be provided in which the two handles operate independently.

If the first two handle embodiment is included in the vehicle seat assembly 20 so that the handles operate interdependently, the seat back release lever (referred to below as the "folding lever") that actuates the recliner and also actuates the folding mechanism would be constructed and arranged to prevent the rear leg lock release lever (referred to below as the "tumbling lever") that unlatches the rear legs 50, 51 from being actuated until the seat back 24 is folded. Thus, the folding lever would lock-out or prevent the tumbling lever from operating until the seat back 24 is folded.

If the second two handle embodiment is included in the vehicle seat assembly 20 so that the handles operate independently, the folding lever would have no lock-out mechanism to prevent the tumbling lever from being actuated and operator judgment would be relied upon for the successful fold and tumble operation of the vehicle seat assembly 20. More specifically, the operator's judgment would be relied upon to not unlock the rear legs 50, 51 and begin vehicle seat tumbling until the seat back 24 has first been folded.

It is appreciated that the vehicle seat assembly 20 may utilize any known type of recliner including any sector gear-type recliner mechanism or any liner-type recliner. It is also contemplated to construct the seat back 24 without a recliner such that the seat back 24 remains in a single position when the seat assembly 20 is in the operative position and can be raised and folded into a storage position.

It is contemplated to provide a mechanism other than the bowden wire cable 48 for interconnecting the release handle 44 with the first release structure 84, including a direct mechanical linkage comprised of a single rigid or flexible mechanical member or a plurality of cooperating rigid or flexible mechanical members interconnected, for example, pivotally, through conventional gears or by any other suitable means.

It is also appreciated to make the unlocking of the rear legs 66, 117 and the beginning of the tumbling movement of the vehicle seat assembly 20 responsive to beginning the folding movement of the seat back 24. This function could be embodied in a vehicle seat which incorporates any known recliner or could be embodied in a vehicle seat which does not include a recliner.

Other variations of the invention are also contemplated. For example, the release mechanism 49 is shown mounted on the inboard riser 54 of the seat riser 28 and the bowden wire cable 48 is shown mounted on the outboard riser 53. The bowden wire cable 48 and the release mechanism 49 could be configured, however, to be mounted on either the outboard 53 or inboard 54 riser of the seat riser 28. They can also be on the same or opposite risers 53, 54 from one another.

It can be appreciated that seat riser 28 and the cooperative tracks 38 are exemplary and that it is contemplated to use a wide range of track configurations and other seat risers with a release mechanism constructed according to the principles of the invention. The release mechanism 49 can be incorporated into the tumble seat assembly with displaceable side handle release disclosed in U.S. Pat. No. 5,671,965 issued Sep. 30, 1997 to James G. O'Connor which patent is hereby incorporated by reference in its entirety into the present application.

It should also be noted that although the bowden wire cable 48 is visible in FIGS. 1 and 2, a portion of the wire cable 48 may be covered when the vehicle seat assembly 20 is installed in the vehicle by a cover structure. This may be done for aesthetic reasons and also to prevent vehicle user contact with the wire cable 48.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A fold and tumble vehicle seat assembly (20) having an automatic retraction feature, said seat assembly (20) comprising;
   a seat cushion (22),
   a seat back (24) mounted to said seat cushion (22),
   a seat riser (28), having forward and rearward ends, mounted to said seat cushion (22) for supporting said seat assembly (20) in an operative position,
   an adjustment mechanism (30) mounted between said seat cushion (22) and said seat riser (28) for providing selected fore and aft adjustment of said seat cushion (22),
   a locking device (118) disposed on said adjustment mechanism (30) for selectively locking said adjustment mechanism (30) and said seat cushion (22) to said seat riser (28),
   at least one rear seat support mounted to said rearward end of said seat riser (28) for supporting a rear portion of said seat assembly (20) while said seat assembly (20) is in said operative position,
   at least one front seat support pivotally mounted to said forward end of said seat riser (28) for supporting a front portion of said seat assembly (20) while said seat assembly (20) is in said operative position and for moving said seat assembly (20) to a tumbled position with said seat cushion (22) pivoting upward about said front seat supports,
   said seat assembly (20) further comprising a release mechanism (49) mounted adjacent said adjustment mechanism (30) and selectively engaging said locking device (118) for automatically unlocking said adjustment mechanism (30) and moving said seat cushion (22) toward said aft position during movement of said seat assembly (20) to said tumbled position.

2. An assembly as set forth in claim 1 wherein said release mechanism (49) includes a housing (128) mounted to said seat riser (28) for supporting said release mechanism (49) near said adjustment mechanism (30) and said locking device (118).

3. An assembly as set forth in claim 2 wherein said release mechanism (49) further includes a moveable portion (130) movably mounted within said housing (128) between a disengaged position spaced from said locking device (118) and an engaged position abutting said locking device (118).

4. An assembly as set forth in claim 3 wherein said moveable portion (130) includes a projecting finger (152) engaging said locking device (118) when said moveable portion (130) is in said engaged position.

5. An assembly as set forth in claim 4 wherein said release mechanism (49) further includes a pinion gear mechanism (132) coupled to said movable portion (130) for slideably moving said movable portion (130) between said disengaged and engaged positions.

6. An assembly as set forth in claim 5 wherein said movable portion (130) includes a plurality of teeth (150) and said pinion gear mechanism (132) includes a gear use coupled to said teeth (150) for removing said movable portion (130).

7. An assembly as set forth in claim 6 wherein said housing (128) includes a plurality of teeth (148) in opposing relationship to said teeth (150) of said movable portion (130) with said gear (156) coupled between said teeth (148) of said housing (128) and said teeth (150) of said movable portion (130).

8. An assembly as set forth in claim 7 wherein said pinion gear mechanism (132) further includes an actuation rod (154) having a first end mounted to said gear (156) and a second end mounted to said front seat support such that movement of said seat assembly (20) toward said tumbled position moves said housing (128) about said pinion gear mechanism (132) which rotates said gear (156) and slideably moves said movable portion (130).

9. An assembly as set forth in claim 8 wherein said housing (128) further includes a planar structure (134) mounted between said seat riser (28) and said adjustment mechanism (30) for supporting said release mechanism (49).

10. An assembly as set forth in claim 9 wherein said housing (128) further includes a pair of legs interlocking with corresponding apertures disposed within said seat riser (28) to fixedly secure said release mechanism (49) to said seat assembly (20).

11. An assembly as set forth in claim 4 wherein said locking device (118) includes a lock plate (170) selectively engaging said adjustment mechanism (30) to selectively lock said adjustment mechanism (30).

12. An assembly as set forth in claim 11 wherein said locking device (118) further includes an arm (188) having an upward camming edge (194) and a lower abutment surface such that said lower abutment surface selectively engages said lock plate (170) to unlock said adjustment mechanism (30).

13. An assembly as set forth in claim 12 wherein said locking device (118) further includes a pivoting lever (174) having an upward portion (178) and a downward portion (180) with said finger (152) of said movable portion (130) engaging said downward portion (180) to rotate said pivoting lever (174) and move said upward portion (178) into engagement with said camming edge (194) of said arm (188) which pushes said arm (188) into engagement with said lock plate (170) to unlock said adjustment mechanism (30).

14. An assembly as set forth in claim 13 wherein said adjustment mechanism (30) includes a stop structure (184) and said pivoting lever (174) further includes an outwardly extending arm portion (182) which engages said stop structure (184) to limit said pivotal movement of said pivoting lever (174).

15. An assembly as set forth in claim 3 wherein said at least one rear seat support comprises first (50) and second (51) rear legs each having a rear latch (70, 71).

16. An assembly as set forth in claim 15 wherein said at least one front seat support comprises first (56) and second (62) front legs each having a front latch (66, 67).

17. An assembly as set forth in claim 16 further including a spring system (106) mounted about each of said first (56) and second (62) front legs to assist said upward pivoting movement of seat assembly (20) during said tumbling of said seat assembly (20).

18. An assembly as set forth in claim 17 further including a strut (230) mounted between said first (56) and second (62) front legs and corresponding first (50) and second (51) rear legs for further assisting said upward pivoting movement of said seat assembly (20).

* * * * *

UNITED STATES PATENT AND TRADEMARK OFFICE
CERTIFICATE OF CORRECTION

PATENT NO. : 6,523,899 B1
DATED : February 25, 2003
INVENTOR(S) : Omar D. Tame

It is certified that error appears in the above-identified patent and that said Letters Patent is hereby corrected as shown below:

Column 1,
Line 18, delete "a".
Line 18, delete "are" and insert -- is -- therefor.
Line 22, delete "move" and insert -- moved -- therefor.
Line 49, delete "exist" and insert -- exists -- therefor.
Line 55, delete "having" and insert -- includes -- therefor.

Column 2,
Line 50, delete "arrange" and insert -- arranged -- therefor.

Column 3,
Line 45, insert -- to -- between "similar" and "FIG".
Line 48, insert -- to -- between "similar" and "FIG".
Line 51, insert -- to -- between "similar" and "FIG".
Line 60, insert -- a -- between "is" and "side".

Column 4,
Line 25, delete "are".

Column 6,
Line 40, delete "springs;" and insert -- springs -- therefor.

Column 7,
Line 48, delete "engaging" and insert -- engages -- therefor.

Column 8,
Line 20, delete "provide" and insert -- provided -- therefor.
Line 22, delete "track" and insert -- tracks -- therefor.

Column 9,
Line 35, delete "it" and insert -- its -- therefor.

Column 10,
Line 61, delete "impact" and insert -- impacts -- therefor.

Column 11,
Line 6, insert -- is -- between "114" and "sufficiently".

UNITED STATES PATENT AND TRADEMARK OFFICE
CERTIFICATE OF CORRECTION

PATENT NO.    : 6,523,899 B1
DATED         : February 25, 2003
INVENTOR(S)   : Omar D. Tame It is certified that error appears in the above-identified patent and that said Letters Patent is hereby corrected as shown below:

Column 12,
Line 3, delete "56" and insert -- 50 -- therefor.
Line 8, delete "2 94" and insert -- 92, 94 -- therefor.
Line 35, delete "of".
Line 57, insert -- leg -- between "front" and "release".
Line 64, delete "handle" and insert --handle -- therefor.

Column 13,
Line 34, insert -- 70 -- between "latch" and "from".

Column 14,
Line 11, insert -- is -- between "22" and "in".
Line 20, delete "structure" and insert -- structures -- therefor.

Column 17,
Line 1, delete "use" and insert -- (156) -- therefor.

Signed and Sealed this

Twenty-second Day of April, 2003

JAMES E. ROGAN
*Director of the United States Patent and Trademark Office*